United States Patent
Kumagai et al.

(10) Patent No.: US 12,501,188 B2
(45) Date of Patent: Dec. 16, 2025

(54) IMAGING APPARATUS, AND METHOD WITH INCREASED READOUT SPEED

(71) Applicant: CANON KABUSHIKI KAISHA, Tokyo (JP)

(72) Inventors: Tomoya Kumagai, Tokyo (JP); Takanori Yamashita, Tokyo (JP); Shinya Ichino, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 239 days.

(21) Appl. No.: 18/324,790

(22) Filed: May 26, 2023

(65) Prior Publication Data
US 2023/0388680 A1    Nov. 30, 2023

(30) Foreign Application Priority Data

May 31, 2022    (JP) .................................. 2022-088835

(51) Int. Cl.
*H04N 25/78* (2023.01)
*H04N 25/60* (2023.01)

(52) U.S. Cl.
CPC ............. *H04N 25/78* (2023.01); *H04N 25/60* (2023.01)

(58) Field of Classification Search
None
See application file for complete search history.

(56) References Cited

U.S. PATENT DOCUMENTS

| | | | | |
|---|---|---|---|---|
| 6,963,372 | B1* | 11/2005 | Hiyama | H04N 25/677 348/E3.018 |
| 7,683,953 | B1* | 3/2010 | Merrill | H04N 25/67 348/308 |
| 2008/0007638 | A1* | 1/2008 | Aoki | H04N 23/667 348/E5.081 |
| 2012/0062776 | A1* | 3/2012 | Egawa | H04N 25/78 348/E9.031 |
| 2018/0184026 | A1* | 6/2018 | Kato | H04N 25/677 |
| 2021/0067720 | A1* | 3/2021 | Benjaram | H10F 39/8037 |
| 2022/0385847 | A1* | 12/2022 | Benjaram | H04N 25/77 |

FOREIGN PATENT DOCUMENTS

WO    2015151793 A1    10/2015

* cited by examiner

*Primary Examiner* — Paul M Berardesca
(74) *Attorney, Agent, or Firm* — Canon U.S.A., Inc. IP Division

(57) ABSTRACT

An apparatus includes a readout line, and a plurality of pixel cells each including a conversion unit, an output unit configured to output a signal corresponding to a charge generated by the conversion unit, and a selection switch provided on a pathway between the output unit and the readout line. The apparatus includes a first switch provided on a pathway between the readout line and a first potential line, a second switch provided on a pathway between the pixel cell and the readout line, and a control unit configured to bring the second switch into an off state during a first period during which the first switch is in an on state.

20 Claims, 16 Drawing Sheets

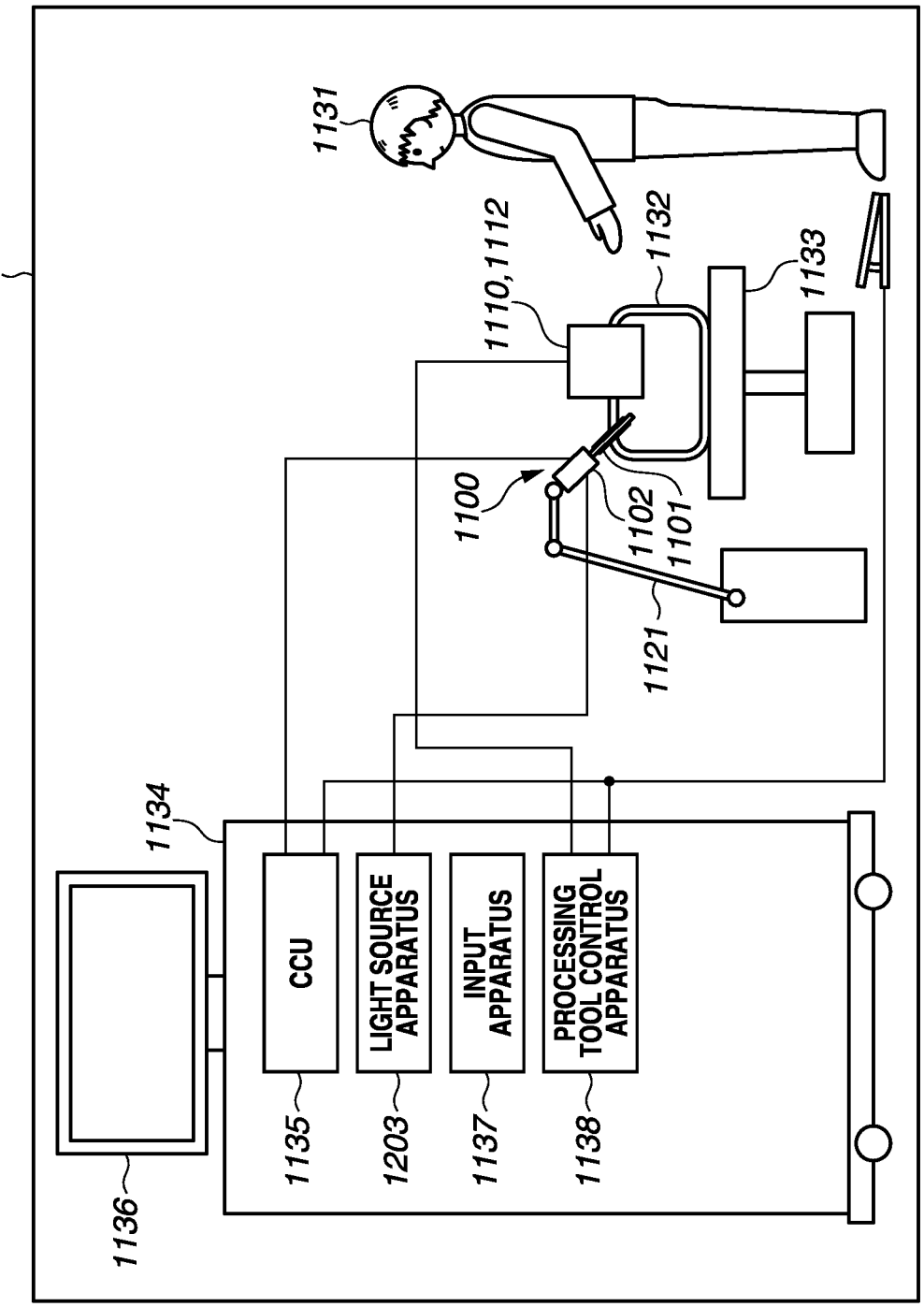

IMAGING APPARATUS, AND METHOD WITH INCREASED READOUT SPEED

BACKGROUND

Technical Field

The aspect of the embodiments relates to a photoelectric conversion apparatus and a driving method of the photoelectric conversion apparatus.

Description of the Related Art

Further speed-up of a signal readout speed for a photoelectric conversion apparatus has been required. WO No. 2015/151793 discusses a configuration in which a potential fixing device is connected to a vertical output line. WO No. 2015/151793 discusses a technique of shortening a time for a potential reset operation of the vertical output line using the configuration.

Further speed-up of a signal readout speed of a photoelectric conversion apparatus has been demanded.

SUMMARY

According to an aspect of the embodiments, an apparatus includes a readout line, and a plurality of pixel cells each including a conversion unit, an output unit configured to output a signal corresponding to a charge generated by the conversion unit, and a selection switch provided on a pathway between the output unit and the readout line. The apparatus includes a first switch provided on a pathway between the readout line and a first potential line, a second switch provided on a pathway between the pixel cell and the readout line, and a control unit configured to bring the second switch into an off state during a first period during which the first switch is in an on state.

Further features of the disclosure will become apparent from the following description of exemplary embodiments with reference to the attached drawings.

BRIEF DESCRIPTION OF THE DRAWINGS

FIG. 15 is a functional block diagram of a photoelectric conversion system according to an eighth exemplary embodiment.

DESCRIPTION OF THE EMBODIMENTS

Figure 1:
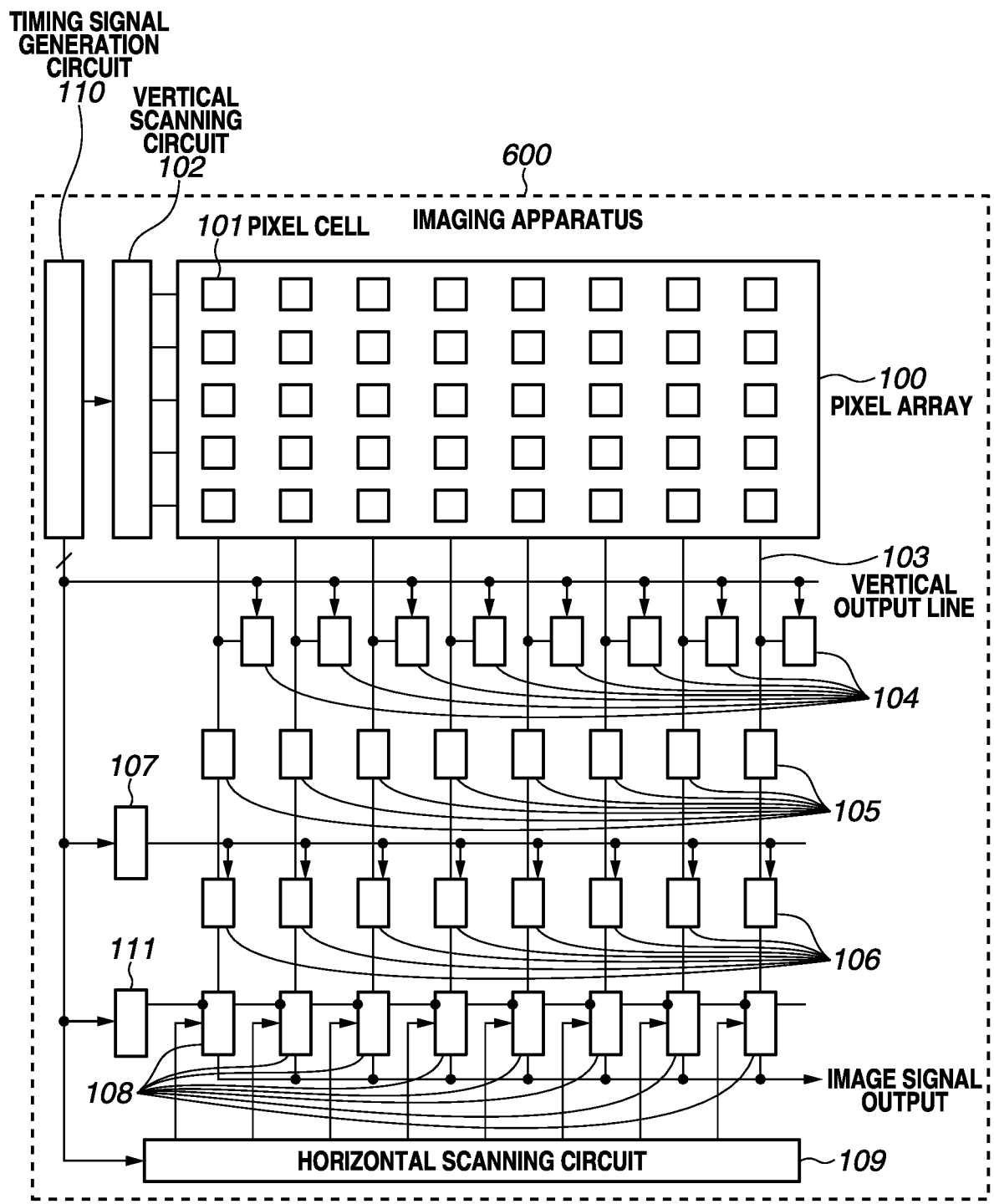
FIG. 1 is a block diagram illustrating a configuration of a photoelectric conversion apparatus according to a first exemplary embodiment.

Hereinafter, a photoelectric conversion apparatus and a driving method thereof according to an exemplary embodiment of the disclosure will be described in detail with reference to the drawings. The following exemplary embodiments are provided to embody the technical idea of the disclosure, and are not intended to limit the disclosure. The sizes and the positional relationship of members illustrated in the drawings are sometimes exaggerated to clarify the description. In the following description, the same components are assigned the same reference numerals, and the description thereof will sometimes be omitted. In each exemplary embodiment to be described below, an imaging apparatus will be mainly described as an example of a photoelectric conversion apparatus. However, a photoelectric conversion apparatus in each exemplary embodiment is not limited to the imaging apparatus, and each exemplary embodiment can also be applied to another example of the photoelectric conversion apparatus. For example, each exemplary embodiment can be applied to a distance measuring apparatus (apparatus for distance measurement that uses focus detection or a time of flight (TOF) sensor, or a photometric apparatus (apparatus for measuring an incident light amount).

A conductivity type of a semiconductor region or a well and a dopant to be implanted, which will be described in an exemplary embodiment to be described below, are examples. The conductivity type and the dopant are not limited to those described in the exemplary embodiment. The conductivity type and the dopant can be appropriately changed from those described in the exemplary embodiment.

Furthermore, in accordance with the change, the potential of the semiconductor region or the well is appropriately changed.

In the configuration to be described below, a switch that controls the conduction or shutoff of an electrical pathway is described. The shutoff of the electrical pathway is not limited to a configuration of flowing no current, and includes a range that can be regarded as substantially-nonconductive.

That is, even in a state described as shutoff state, the existence of leak current flowing in the switch is allowed.

The shutoff of electrical connection can also be said to be a state in which an electrical pathway is in a nonconductive state.

A photoelectric conversion apparatus according to a first exemplary embodiment will now be described with reference to FIGS. 1 to 3.

FIG. 1 illustrates a block diagram of an imaging apparatus serving as an example of a photoelectric conversion apparatus according to the first exemplary embodiment.

An imaging apparatus 600 includes a pixel array 100, a vertical scanning circuit 102, vertical output lines 103, charge units 104, amplification units 105, and comparators 106. The imaging apparatus 600 further includes a ramp signal generation circuit 107, signal holding units 108, a horizontal scanning circuit 109, a timing signal generation circuit 110 (control unit), and a counter 111. The pixel array 100 includes a plurality of pixel cells 101 arranged in a matrix. Typically, one pixel cell can be treated as one pixel, but an example is not limited to this example. For example, a plurality of pixels can also be treated as one pixel cell. The number of pixel cells 101 included in the pixel array 100 is not specifically limited. For example, the pixel array 100 can include pixel cells 101 arranged on several thousands of rows and several thousands of columns, or the pixel array 100 can include pixel cells 101 arranged on one row or one column. A pixel cell 101 generates an analog signal corresponding to an incident light amount, by photoelectric conversion. Each row of the pixel array 100 is selected in accordance with a signal supplied from the vertical scanning circuit 102. A signal of the selected row is read out to a vertical output line 103, and input to an amplification unit 105. A charge unit 104 is a circuit that fixes the potential of the vertical output line 103 to a predetermined potential.

The signal input to the amplification unit 105 is amplified by a predetermined gain and input to a comparator 106. The ramp signal generation circuit 107 is a circuit that generates a ramp signal to be used for AD conversion. The ramp signal generation circuit 107 generates a reference voltage that monotonically increases or monotonically decreases as time passes. The potential of the ramp signal can change in a slope shape, or can change in a staircase pattern. A comparator 106 compares the input signal and the ramp signal.

The counter 111 reads, as a count signal, a comparison signal output from the comparator 106, and imports the count signal into a signal holding unit 108 as a digital value. Digital values stored on the columns of the signal holding unit 108 are sequentially output as image signals by the scans performed by the horizontal scanning circuit 109. Each circuit block in the block diagram is controlled based on a pulse signal generated by the timing signal generation circuit 110.

Figure 2:
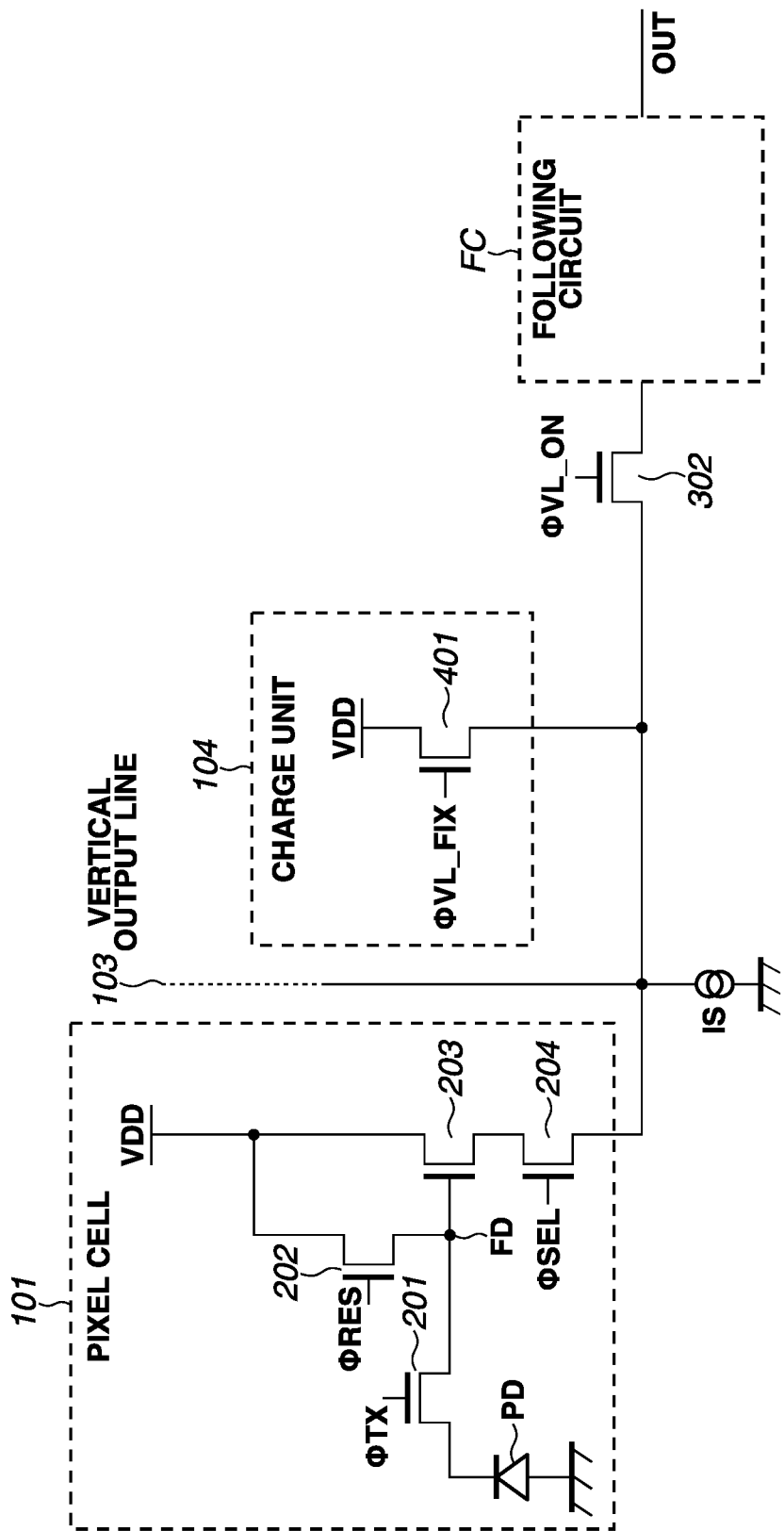
FIG. 2 is a diagram including an equivalent circuit diagram of a pixel of the photoelectric conversion apparatus according to the first exemplary embodiment.

FIG. 2 illustrates an equivalent circuit diagram of the pixel cell 101 of the photoelectric conversion apparatus according to the first exemplary embodiment. In the following description, a high level and a low level of each signal will be described as "HI" and "LO", respectively. The HI is a level at which a transistor or a switch to which a corresponding signal is input is controlled to enter an on state. The LO is a level at which a transistor or a switch to which a corresponding signal is input is controlled to enter an off state. That is, if a transistor to which each signal is input is a P-channel metal oxide semiconductor (PMOS) transistor, the potential at HI becomes a potential lower than the potential at LO. In contrast, if a transistor to which each signal is input is an N-channel metal oxide semiconductor (NMOS) transistor, the potential at HI becomes a potential higher than the potential at LO. In this example, the description will be given assuming that each signal controls an NMOS transistor.

In FIG. 2, the pixel cell 101 includes a photoelectric conversion element PD (photoelectric conversion unit), a floating diffusion FD, and a transfer transistor 201 (transfer unit). The pixel cell 101 further includes a reset transistor 202 (reset unit), an amplification transistor 203 (output unit), and a row selection transistor 204 (selection switch). The transfer transistor 201 is controlled in accordance with a control signal ΦTX input to a gate. The reset transistor 202 is controlled in accordance with a control signal ΦRES input to a gate. The amplification transistor 203 is connected to the floating diffusion FD at a gate. The row selection transistor 204 is controlled in accordance with a control signal ΦSEL input to a gate. The control signals ΦTX, ΦRES, and ΦSEL are signals output from the vertical scanning circuit 102 to the pixel cell 101.

As described above, on a readout-selected row selected in accordance with a signal supplied from the vertical scanning circuit 102, a charge photoelectrically-converted by the photoelectric conversion element PD is transferred to the floating diffusion FD, and converted into a voltage. By the row selection transistor 204 entering an on state, the amplification transistor 203 operates as a source follower transistor, and a signal that is based on the photoelectrically-converted charge is read out to the vertical output line 103. The vertical output line 103 is connected to a plurality of pixel cells 101 arranged on the same column in the pixel array 100, the charge unit 104, and a common current source IS, and connected to a following circuit FC via a connection switch 302. Specifically, the following circuit FC includes the amplification unit 105, the comparator 106, and the signal holding unit 108.

The vertical output line 103 will be described as a term that refers to a pathway from the pixel cell 101 to the following circuit FC.

The charge unit 104 includes a charge element 401. The charge element 401 is a transistor operating as, for example, a switch, and the charge element 401 is controlled in accordance with a control signal ΦVL_FIX input to a gate. The control signal ΦVL_FIX is a signal output by the timing signal generation circuit 110 serving as a control unit. The charge element 401 is connected to a source voltage VDD at a drain, and connected to the vertical output line 103 at a source. By setting the level of the control signal ΦVL_FIX to HI, the charge element 401 enters the on state. The control signal ΦVL_FIX is input to the gate of the charge element 401. By the charge element 401 entering the on state, the potential of the vertical output line 103 is fixed to a potential corresponding to a gate voltage of the charge element 401. A signal potential to be read out to the vertical output line 103 is a signal potential VL_OUT. The charge element 401 can also be called a first switch provided on an electrical pathway between the vertical output line 103 and a first reference potential line.

The connection switch 302 is arranged on an electrical pathway between the pixel cell 101 and the following circuit FC.

The connection switch 302 is controlled in accordance with a control signal ΦVL_ON output from the timing signal generation circuit 110. By setting the level of the control signal ΦVL_ON to HI, the pixel cell 101 and the following circuit FC are electrically connected. Hereinafter, an electrically-connected state will sometimes be described as connection or electric connection. When the level of the control signal ΦVL_ON is set to LO, electric connection between the pixel cell 101 and the following circuit FC is shut off. The connection switch 302 can also be called a second switch provided on an electrical pathway between the pixel cell 101 and the following circuit FC.

Figure 3:
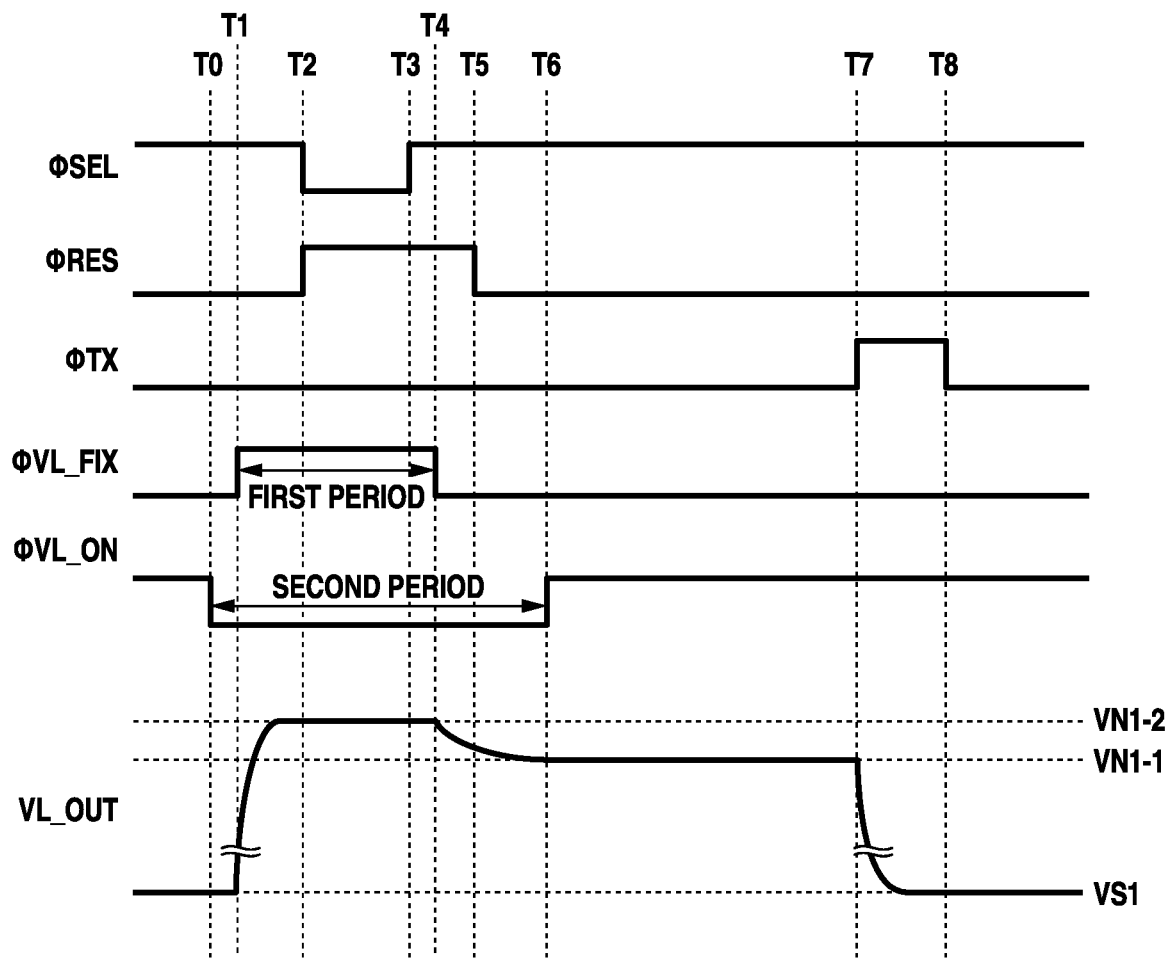
FIG. 3 is a timing chart illustrating a comparative example of an operation of a photoelectric conversion apparatus.

FIG. 3 is a timing chart illustrating an operation of the photoelectric conversion apparatus according to the present exemplary embodiment.

The signal potential VL_OUT to be input to the vertical output line 103 (the potential of the vertical output line 103) that corresponds to an amount of incident light to the pixel cell 101 is referred to as a potential VS1. A reset potential of the vertical output line 103 is referred to as a potential VN1-1. The highest potential during the operation of the charge unit 104 is referred to as a potential VN1-2.

At a time T0, the level of the control signal ΦSEL is set to HI, and the levels of the control signals ΦRES, ΦTX, and ΦVL_FIX are set to LO. The level of the control signal ΦVL_ON transitions from HI to LO at the time T0, and electric connection between an output node of the pixel cell 101 and the following circuit FC is shut off. At this time, the potential VL_OUT of the vertical output line 103 indicates the potential VS1 corresponding to an incident light amount to the pixel cell 101.

At a time T1, the source voltage VDD is applied as a source-drain voltage of the charge element 401 by setting the level of the control signal ΦVL_FIX to HI. A source potential of the charge element 401 and the potential VL_OUT of the vertical output line 103 are fixed by the charge element 401 to a predetermined potential (potential close to the source voltage VDD), and the potential VL_OUT of the vertical output line 103 changes from the potential VS1 to the potential VN1-2 during a period from the time T1 to T2. The charge element 401 is an element that can supply a voltage with a steep rise-up. Thus, the potential of the vertical output line 103 can be changed to a reset potential at high speed. In other words, the vertical output line 103 is reset at high speed by the operation of the charge unit 104.

At the time T2, previous pixel row selection is cancelled by the level of the control signal ΦSEL being set to LO and the row selection transistor 204 entering the off state. Furthermore, the charge of the floating diffusion FD is reset by the level of the control signal ΦRES being set to HI and the reset transistor 202 entering the on state.

At a time T3, the level of the control signal ΦSEL is set to HI, and the row selection transistor 204 enters the on state. A source of the amplification transistor 203 on a corresponding pixel row is thereby connected to the vertical output line 103, and the corresponding pixel row enters a selected state.

At a time T4, the potential at the gate of the charge element 401 becomes a ground potential GND by setting the level of the control signal ΦVL_FIX to LO, and an operation of the charge unit 104 is cancelled. At this time, the potential VL_OUT of the vertical output line 103 starts to converge from the potential VN1-2 to the potential VN1-1 because the potential VL_OUT of the vertical output line 103 converges to the reset potential of the pixel cell 101.

A period during which the level of the control signal ΦVL_FIX is set to HI in this manner from the time T1 to T4 (i.e., a period during which the charge unit 104 operates) will be referred to as a first period.

At a time T5, the level of the control signal ΦRES is set to LO, and the reset transistor 202 enters the off state. The charge reset of the floating diffusion FD accordingly ends. The level of the control signal ΦVL_ON is set to HI at a time T6. A period during which the level of the control signal ΦVL_ON is set to LO in this manner (i.e., a period during which electric connection between the vertical output line 103 and the amplification unit 105 is shut off) will be referred to as a second period.

At a time T7, the level of the control signal ΦTX is set to HI, and the transfer transistor 201 enters the on state. At this time, charges accumulated in the photoelectric conversion element PD are transferred to the floating diffusion FD, and the potential VL_OUT of the vertical output line 103 changes from the potential VN1-1 to the potential VS1.

At a time T8, the level of the control signal ΦTX is set to LO and the transfer transistor 201 enters the off state, and thereby charge transfer from the photoelectric conversion element PD to the floating diffusion FD ends.

As described above, the vertical output line 103 and an input node of the following circuit FC are separated by the connection switch 302 in a case where the vertical output line 103 is reset at high speed using the charge unit 104. Accordingly, electric connection of a part of the vertical output line 103 that follows the connection switch 302 is separated from the charge unit 104. With this configuration, drive load of the charge unit 104 can be reduced, and the vertical output line 103 can be reset at higher speed. Alternatively, the vertical output line 103 can be reset while the following circuit FC is processing a signal. In a case where the connection switch 302 is not included, it is assumed that the vertical output line 103 is reset after the processing of the following circuit FC ends. As compared with this configuration, the vertical output line 103 can be reset during a period during which the following circuit FC is performing processing, and a next signal of the pixel array 100 can be read out at a further earlier timing, according to the present exemplary embodiment. It is thus possible to speed up signal processing of the photoelectric conversion apparatus.

A second exemplary embodiment will be described with reference to FIGS. 4 to 6. The components similar to those in the first exemplary embodiment are assigned the same reference numerals, and the description thereof will be omitted.

Figure 4:
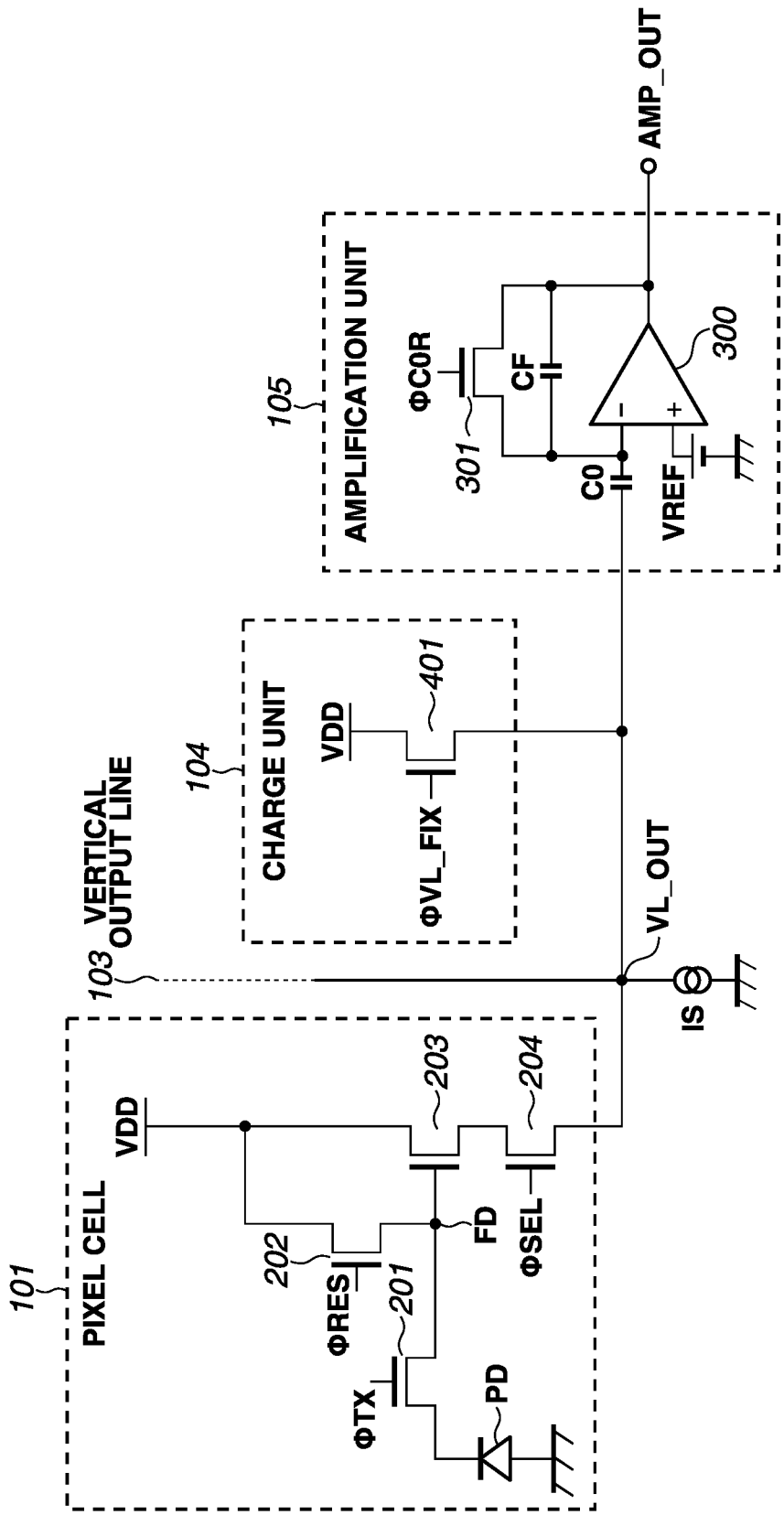
FIG. 4 is a diagram including an equivalent circuit diagram of a pixel of a photoelectric conversion apparatus according to a second exemplary embodiment.

FIG. 4 is a diagram including an equivalent circuit diagram of a pixel of a photoelectric conversion apparatus according to the second exemplary embodiment. As compared with the pixel illustrated in FIG. 2, the pixel does not include the connection switch 302, and includes the amplification unit 105 as a following circuit. In FIG. 4, the amplification unit 105 includes a differential amplifier 300, a reset switch 301, a clamp capacitor C0, a feedback capacitor CF, and a reference voltage source. A reference voltage VREF is input from the reference voltage source to a non-inverted input node of the differential amplifier 300. The reset switch 301 is connected between the non-inverted input node and an output node, and controlled in accordance with a control signal ΦC0R output from the timing signal generation circuit 110. The reset switch 301 can also be called a third switch connected to the input node and the output node. By setting the level of the control signal ΦC0R to HI, the input node and the output node of the differential amplifier 300 enter a connected state. This state is a state in which the input node and the output node of the differential amplifier 300 are short-circuited. The differential amplifier 300 thereby enters a voltage follower state. The clamp capacitor C0 is arranged between the vertical output line 103 and an inverted input node of the differential amplifier 300. The feedback capacitor CF is arranged between the inverted input node and the output node. Based on a capacity ratio C0/CF between the clamp capacitor C0 and the feedback capacitor CF, the amplification unit 105 inverting-amplifies an input signal. Hereinafter, the signal to be output after inverted and amplified will be described as an amplification unit output AMP_OUT.

Figure 5:
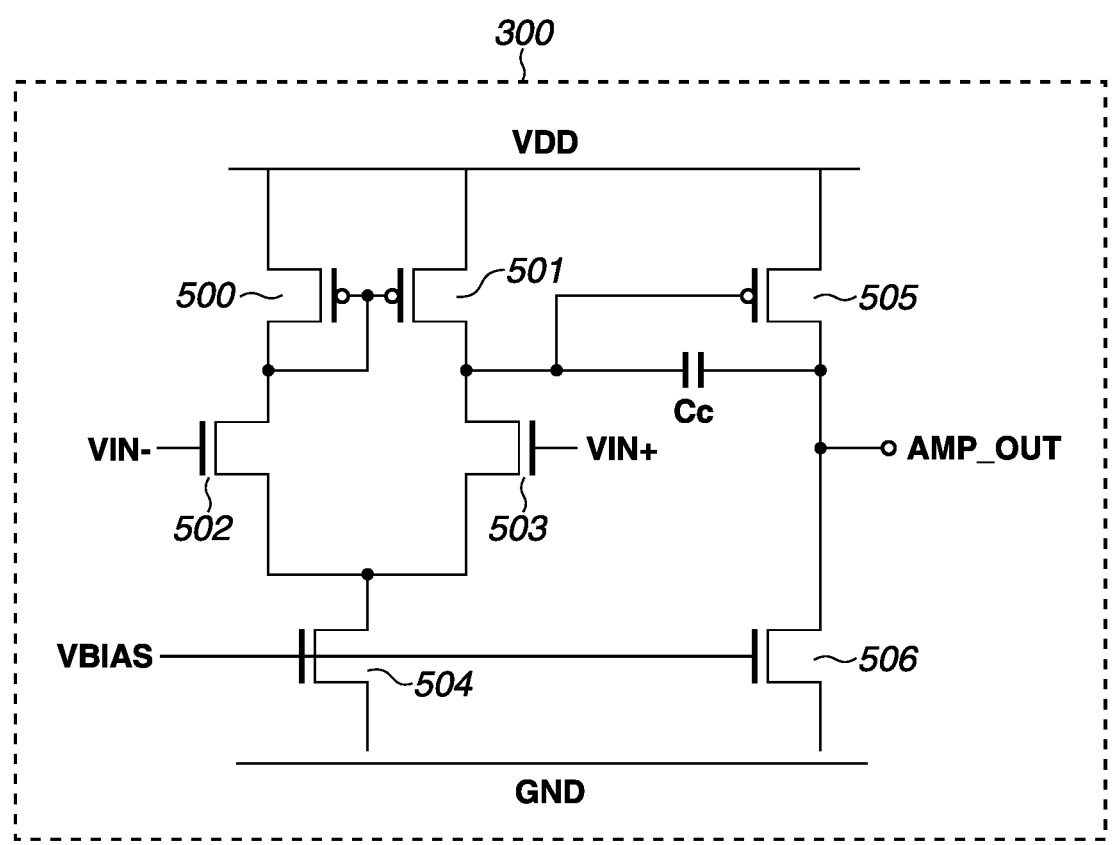
FIG. 5 is a circuit diagram illustrating a configuration example of a differential amplifier of the photoelectric conversion apparatus according to the second exemplary embodiment.

FIG. 5 illustrates a configuration example of the differential amplifier 300. The differential amplifier 300 includes a differential input stage and an output stage.

The differential input stage includes a current mirror unit consisting of a PMOS transistor 500 and a PMOS transistor 501, a differential input pair including an NMOS transistor 502 and an NMOS transistor 503, and an NMOS transistor 504 that flows a constant current. A gate of the NMOS transistor 502 corresponds to an inverted input node (VIN−), and a gate of the NMOS transistor 503 corresponds to a non-inverted input node (VIN+).

The output stage includes a source ground circuit including a PMOS transistor 505 and an NMOS transistor 506 that flows a constant current, and a phase compensation capacitor Cc. A voltage at the output node of the differential amplifier 300 corresponds to that of the amplification unit output AMP_OUT. Gates of the NMOS transistor 504 and the NMOS transistor 506 are controlled at a bias voltage VBIAS, and the NMOS transistor 504 and the NMOS transistor 506 act as a constant current source.

FIGS. 4 and 5 illustrate the differential amplifier 300 as an example of an amplifier, but the configuration of the amplifier is not limited to this. An effect of the aspect of the embodiments can also be obtained in a case where a single-ended amplifier is used, for example.

A comparative example of a driving method of a photoelectric conversion apparatus will now be described with reference to FIG. 6. FIG. 6 is a timing chart illustrating, in solid lines, driving of a photoelectric conversion apparatus that is performed when an issue occurs in the comparative example.

The signal potential VL_OUT, which is the potential of the vertical output line 103, to be input to the vertical output line 103 is referred to as a potential VS1. The signal potential VL_OUT corresponds to an amount of incident light to the pixel cell 101. A reset potential of the vertical output line 103 is referred to as a potential VN1-1. The highest potential during the charge unit 104 operates is referred to as a potential VN1-2.

The potential of a signal obtained by the amplification unit 105 inverting-amplifying the potential VL_OUT of the vertical output line 103 at a predetermined gain is referred to as a potential VS2. A reset potential to which the amplification unit 105 is to originally converge the potential VL_OUT of the vertical output line 103 is referred to as a potential VN2-1, and the reset potential will be referred to as a first potential. A lowest potential obtained when the charge unit 104 operates is referred to as a potential VN2-2, and the potential will be referred to as a second potential. Furthermore, a reset potential to be used when a reset potential of the amplification unit 105 varies is referred to as a potential VN2-3.

Hereinafter, each signal waveform and a circuit operation state will be chronologically described.

At a time T0, the level of the control signal ΦSEL is set to HI, and the levels of the control signals ΦRES, ΦTX, ΦC0R, and ΦVL_FIX are set to LO. At this time, the potential VL_OUT of the vertical output line 103 indicates the potential VS1 corresponding to an incident light amount to the pixel cell 101. The amplification unit 105 inverting-amplifies the potential VL_OUT of the vertical output line 103 at a predetermined gain, and the amplification unit output AMP_OUT indicates the potential VS2.

At a time T1, the source voltage VDD is applied as a source-drain voltage of the charge element 401 by the timing signal generation circuit 110 setting the level of the control signal ΦVL_FIX to HI. A source potential of the charge element 401 and the potential VL_OUT of the vertical output line 103 are fixed by the charge element 401 to a predetermined potential (potential close to the source voltage VDD), and the potential VL_OUT of the vertical output line 103 changes from the potential VS1 to the potential VN1-2 during a period from the time T1 to T2.

The charge element 401 is an element that can supply a voltage with a steep rise-up. Thus, the potential of the vertical output line 103 can be changed to a reset potential at high speed. In other words, the vertical output line 103 is reset at high speed by the operation of the charge unit 104.

At the same time, the potential VL_OUT of the vertical output line 103 is input to the inverted input node of the differential amplifier 300. At this time, the potential VL_OUT of the vertical output line 103 is inverted and amplified based on the capacity ratio C0/CF between the clamp capacitor C0 and the feedback capacitor CF. The amplification unit output AMP_OUT accordingly changes from the potential VS2 to the potential VN2-2. At this time, the potential VN2-2 indicates a potential lower than the potential VN2-1 serving as a reset potential.

By the amplification unit output AMP_OUT changing from the potential VS2 to the potential VN2-2, a drain-source voltage (VDS) of the NMOS transistor 506 becomes a voltage corresponding to the potential VN2-2. Because an overdrive voltage stops being applied, it becomes difficult for the NMOS transistor 506 to flow a constant current. A drain current of the NMOS transistor 506 becomes small, and a stable operation becomes difficult. The reset potential of the amplification unit 105 accordingly changes from an ideal value. That is, a variation in potential of the vertical output line 103 affects the reset potential of the amplification unit 105.

At a time T2, previous pixel row selection is cancelled by the level of the control signal ΦSEL being set to LO and the row selection transistor 204 entering the off state. Furthermore, the charge of the floating diffusion FD is reset by the level of the control signal ΦRES being set to HI and the reset transistor 202 entering the on state.

By setting the level of the control signal ΦC0R to HI, the input node and the output node of the differential amplifier 300 are short-circuited, and the differential amplifier 300 enters the voltage follower state. At this time, a reset operation is started in such a manner that potentials of the inverted input node, the non-inverted input node, and the amplification unit output AMP_OUT become the same potential. Since the reference voltage source is connected to the non-inverted input node, the amplification unit output AMP_OUT operates in such a manner as to converge to the reference voltage VREF. The amplification unit output AMP_OUT accordingly starts the reset operation from the potential VN2-2 toward the potential VN2-1.

At a time T3, the level of the control signal ΦSEL is set to HI, and the row selection transistor 204 enters the on state. A source of the amplification transistor 203 on a corresponding pixel row is thereby connected to the vertical output line 103, and the corresponding pixel row enters a selected state.

By setting the level of the control signal ΦVL_FIX to LO at a time T4, the potential at the gate of the charge element 401 becomes a ground potential GND, and an operation of the charge unit 104 is cancelled. At this time, the potential VL_OUT of the vertical output line 103 converges to the reset potential of the pixel cell 101. The potential VL_OUT of the vertical output line 103 accordingly converges from the potential VN1-2 to the potential VN1-1.

A period will be referred to as a first period during which the level of the control signal ΦVL_FIX is set to HI in this manner from the time T1 to T4 (i.e., a period during which the charge unit 104 operates).

At a time T5, the level of the control signal ΦRES is set to LO, and the reset transistor 202 enters the off state. The charge reset of the floating diffusion FD accordingly ends.

By setting the level of the control signal ΦC0R to LO at a time T6, the short-circuited state of the input node and the output node of the differential amplifier 300 is cancelled, and the reset operation of the amplification unit 105 is cancelled. From the time T2, the amplification unit output AMP_OUT has started the reset operation from the potential VN2-2 toward the potential VN2-1. Nevertheless, as described above, the NMOS transistor 506 is in a state of being unable to flow a constant current, during a reset operation time of the amplification unit 105. Accordingly, the amplification unit output AMP_OUT has not converged to the potential VN2-1, and indicates the potential VN2-3 being an intermediate potential between the potential VN2-1 and the potential VN2-2 at the time T6.

The potential VN2-3 is not an ideal reset potential, and thus a potential difference between the potential VN2-1 being an ideal reset potential, and the potential VN2-3 can be regarded as an error. As the capacity ratio C0/CF becomes larger, a time required for a reset potential to converge to the potential VN2-1 becomes longer, and a potential difference between the potential VN2-1 and the potential VN2-3 accordingly becomes larger as well.

A period during which the level of the control signal ΦC0R is set to HI in this manner from the time T2 to T6 (i.e., a period during which the amplification unit 105 is reset) will be referred to as a third period.

The amplification unit output AMP_OUT read out during a period from time T6 to T7 is AD-converted. As an error between the potential VN2-1 being an ideal reset potential and the potential VN2-3 read out as the amplification unit output AMP_OUT becomes larger, an AD conversion result deviates more from an original value.

An AD-converted value of the amplification unit output AMP_OUT is held in the signal holding unit 108. The amplification unit output AMP_OUT and a value held in the signal holding unit 108 vary depending on the amplification unit 105 arranged for each column. In other words, an error varying for each column is added to a signal output from each of the pixel cells 101, and therefore image degradation might occur.

At the time T7, the level of the control signal ΦTX is set to HI, and the transfer transistor 201 enters the on state. At this time, charges accumulated in the photoelectric conversion element PD are transferred to the floating diffusion FD, and the potential VL_OUT of the vertical output line 103 changes from the potential VN1-1 to the potential VS1. A signal that is based on the charges is input to the inverted input node of the differential amplifier 300, and the amplification unit output AMP_OUT changes from the potential VN2-3 to the potential VS2.

After a time T8, the level of the control signal (TX is set to LO and the transfer transistor 201 enters the off state, and thereby charge transfer from the photoelectric conversion element PD to the floating diffusion FD ends.

As described above, if a time required for a reset potential to converge to the potential VN2-1 becomes long and a potential difference between the potential VN2-1 and the potential VN2-3 becomes large, an error to be added to an AD conversion result and influence on the image quality of an image to be output become large. To enable high-speed driving and prevent deterioration in signal accuracy, in one embodiment, a potential relationship becomes voltage V2>(voltage V1−voltage V2), where the voltage V1 is a potential difference from a reference potential to the first potential, and the voltage V2 is a potential difference from the reference potential to the second potential.

Figure 6:
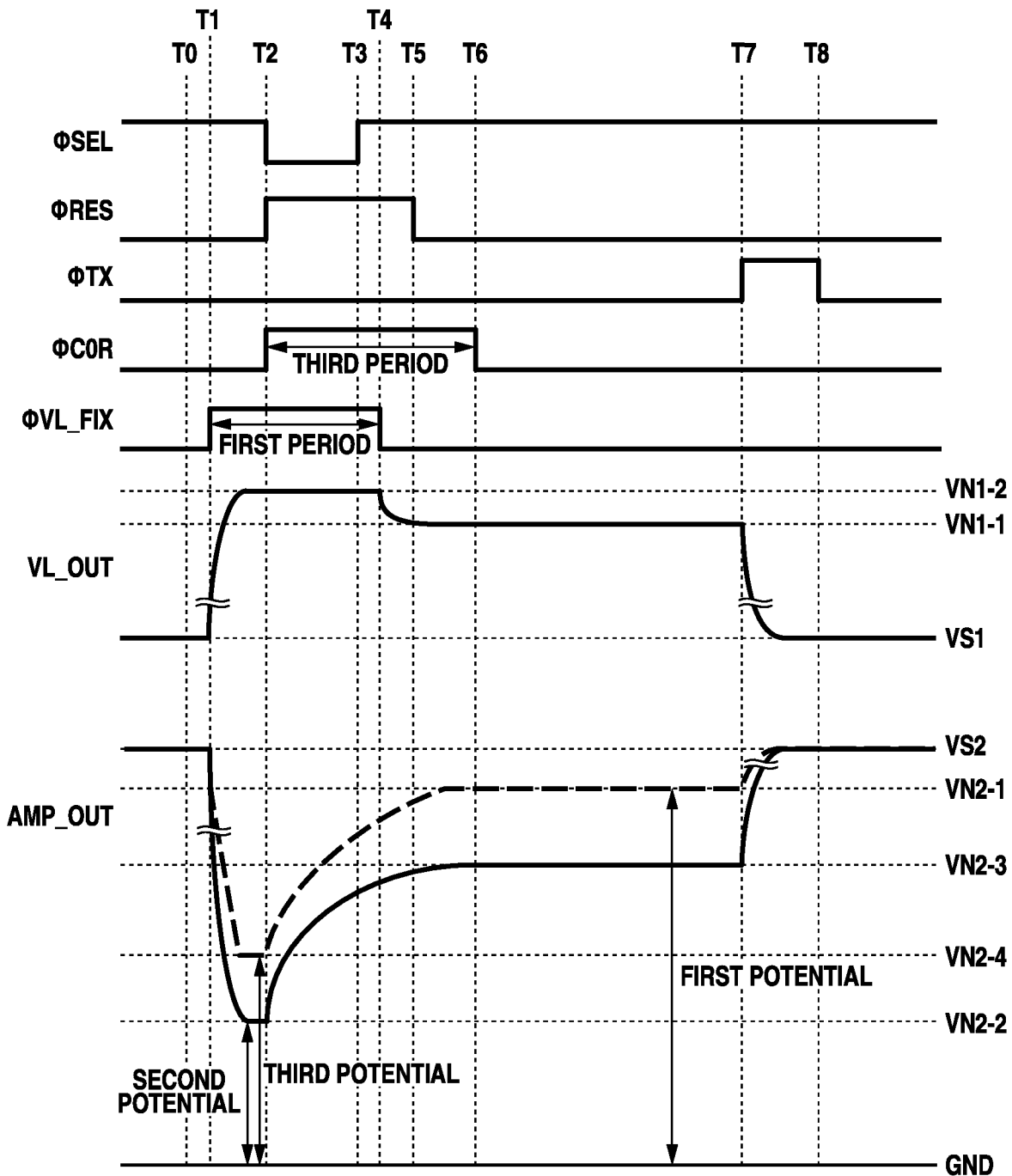
FIG. 6 is a timing chart illustrating a comparative example of an operation of a photoelectric conversion apparatus.

FIG. 6 illustrates, in a dashed-dotted line, the amplification unit output AMP_OUT obtained in a case where the above-described potential relationship is satisfied. The lowest potential obtained when the charge unit 104 operates is referred to as a potential VN2-4, and the potential will be referred to as a third potential. In other words, the amplification unit output AMP_OUT indicated by the dashed-dotted line in FIG. 6 satisfies a relationship of voltage V3>(voltage V1−voltage V3).

When the level of the control signal ΦC0R is set to HI at the time T2, the amplification unit output AMP_OUT starts a reset operation from the potential VN2-4 to the potential VN2-1. Thereafter, the reset operation of the amplification unit 105 is cancelled when the level of the control signal ΦC0R is set to LO at the time T5. The amplification unit output AMP_OUT indicates the potential VN2-1, which is an original reset potential.

Although the potential VN2-4 is a value lower than the potential VN2-1, it is possible to shorten a recovery time until the NMOS transistor 506 restarts a stable operation, in a case where the relationship of voltage V3>(voltage V1−voltage V3) is satisfied as compared with a case where the relationship of voltage V3>(voltage V1−voltage V3) is unsatisfied. After the reset operation of the amplification unit 105, the amplification unit output AMP_OUT therefore becomes a value closer to the potential VN2-1, and an error in an AD conversion result of the amplification unit output AMP_OUT becomes smaller as compared with the comparative example (solid line in FIG. 6).

That is, in a case where the amplification unit output AMP_OUT satisfies the relationship of voltage V2>(voltage V1−voltage V2) in FIG. 6, the potential can recover to the reset potential within a predetermined time by the reset operation of the amplification unit 105, even if it becomes unable to flow a predetermined current to the NMOS transistor 506. Consequently, it is possible to reduce an error in an AD conversion result to be obtained when AD conversion of a signal that is based on the potential VL_OUT of the vertical output line 103 is performed, and both high-speed driving and image degradation reduction can be achieved.

Figure 7:
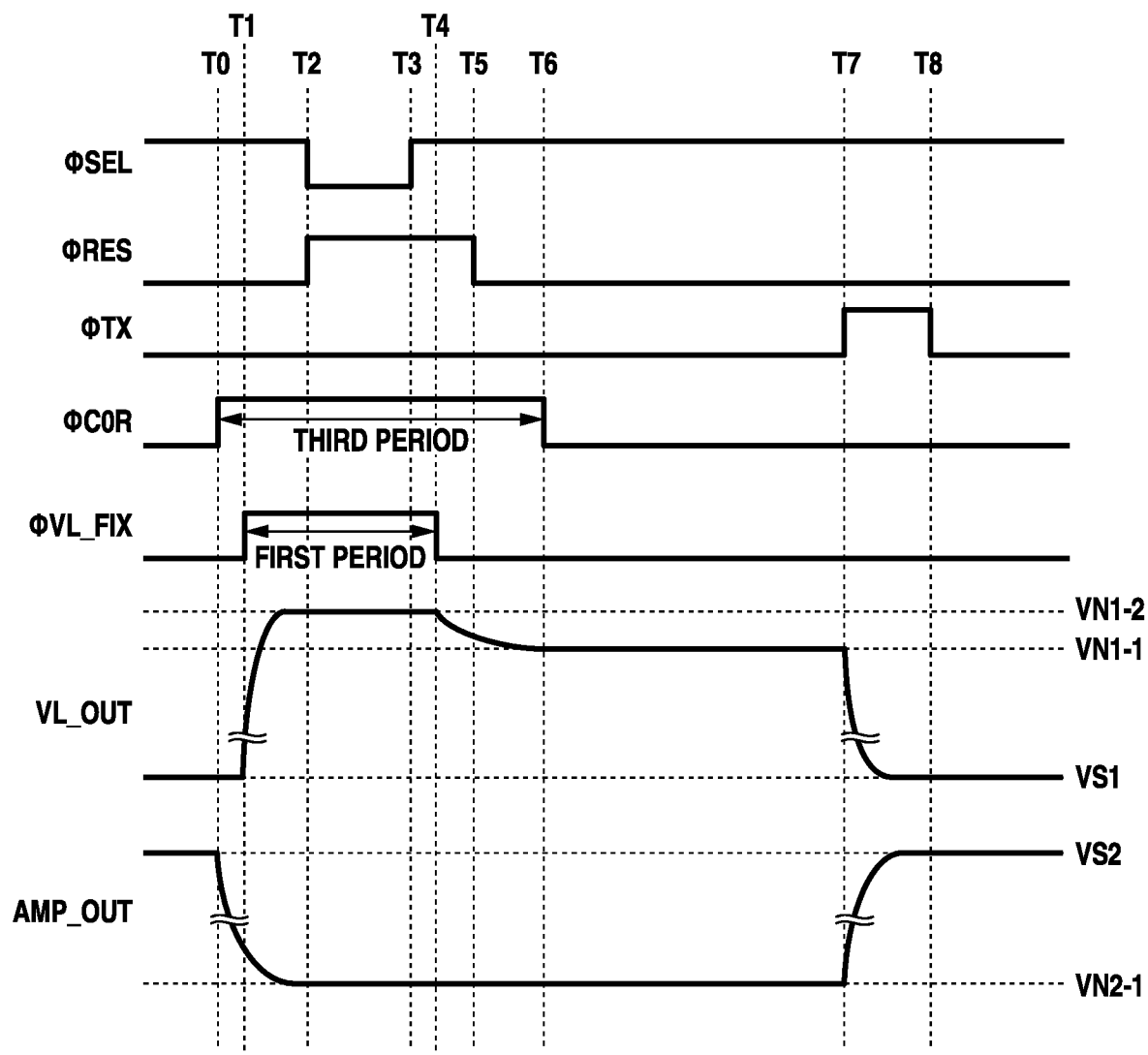
FIG. 7 is a timing chart illustrating an operation of the photoelectric conversion apparatus according to the second exemplary embodiment.

FIG. 7 is a timing chart illustrating an example of an operation of a photoelectric conversion apparatus for realizing the above-described potential relationship.

As described above, during the first period from the time T1 to T4, a high-speed reset operation of the vertical output line 103 is performed. The potential VL_OUT of the vertical output line 103 changes from the potential VS1 to the potential VN1-2.

Furthermore, during the third period from the time T0 to T6, the amplification unit 105 is in the voltage follower state. Thus, the potentials of inverted input node, the non-inverted input node, and the amplification unit output AMP_OUT become the same potential, and converge to the potential VN2-1 (reference voltage VREF) serving as a reset potential.

In the present exemplary embodiment, the third period encompasses the first period. In this driving, a reset operation of the vertical output line 103 to a default value is performed using the charge unit 104, during a period during which the amplification unit 105 is in the voltage follower state. In this case, even if the potential VL_OUT varies by the reset operation of the vertical output line 103, the amplification unit 105 maintains the potential VN2-1 serving as a reset potential. Thus, the amplification unit output AMP_OUT does not vary. As a result, it is possible to realize high-speed driving while preventing image degradation caused by an output variation of an amplification unit.

Figure 8:
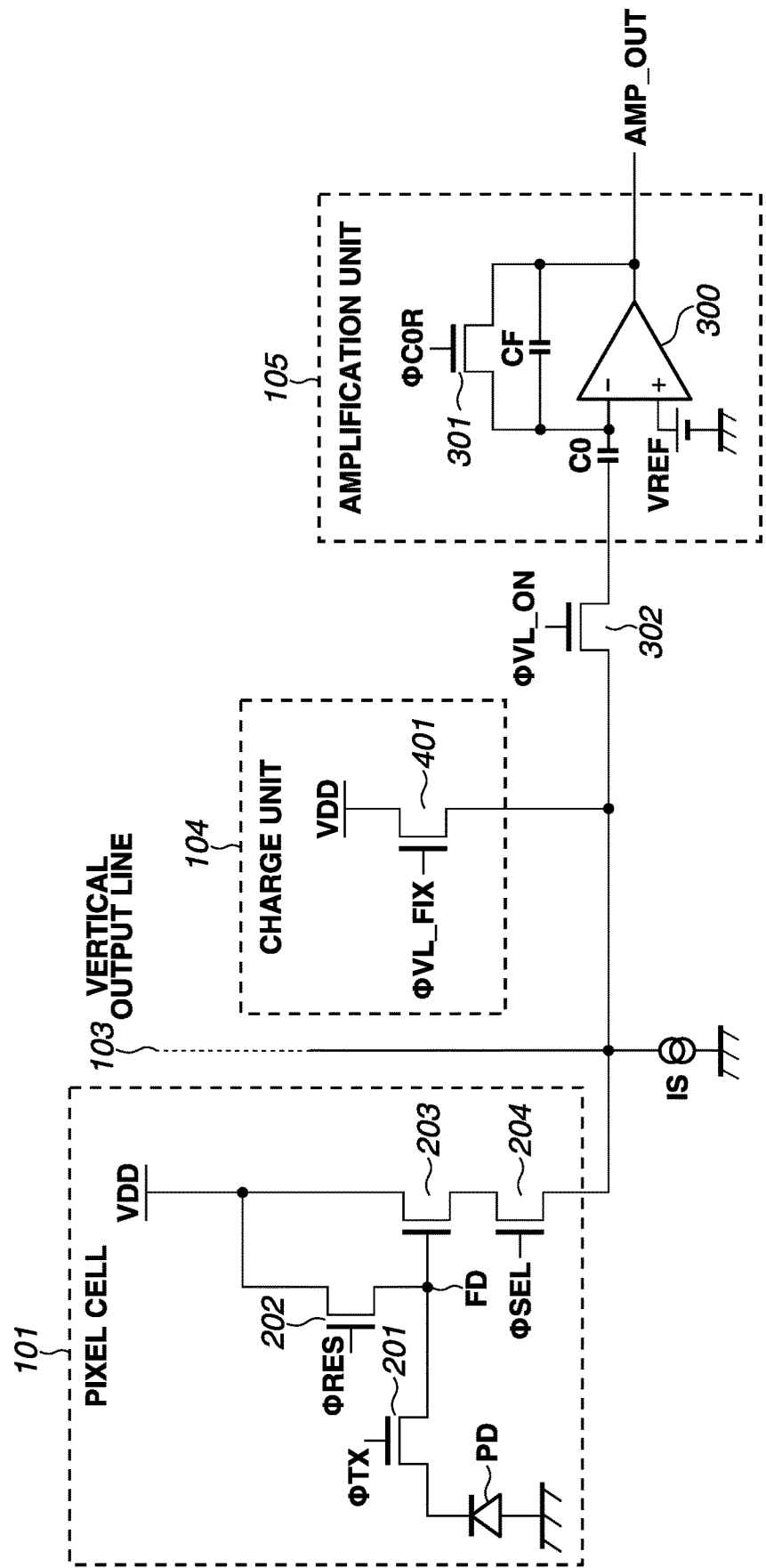
FIG. 8 is a diagram including an equivalent circuit diagram of a pixel of a photoelectric conversion apparatus according to a third exemplary embodiment.

A third exemplary embodiment will now be described with reference to FIGS. 8 and 9. The components similar to those in the first and second exemplary embodiments are assigned the same reference numerals, and the description thereof will be omitted. The third exemplary embodiment is an example of a configuration and an operation of a photoelectric conversion apparatus for realizing the potential relationship described in the second exemplary embodiment.

In the photoelectric conversion apparatus according to the present exemplary embodiment, the connection switch 302 is connected between the vertical output line 103 and the clamp capacitor C0 of the amplification unit 105, and is controlled in accordance with a control signal ΦVL_ON. If the level of the control signal ΦVL_ON is set to HI, the vertical output line 103 and the amplification unit 105 are connected. When the level of the control signal ΦVL_ON is set to LO, electric connection between the vertical output line 103 and the amplification unit 105 is shut off.

Figure 9:
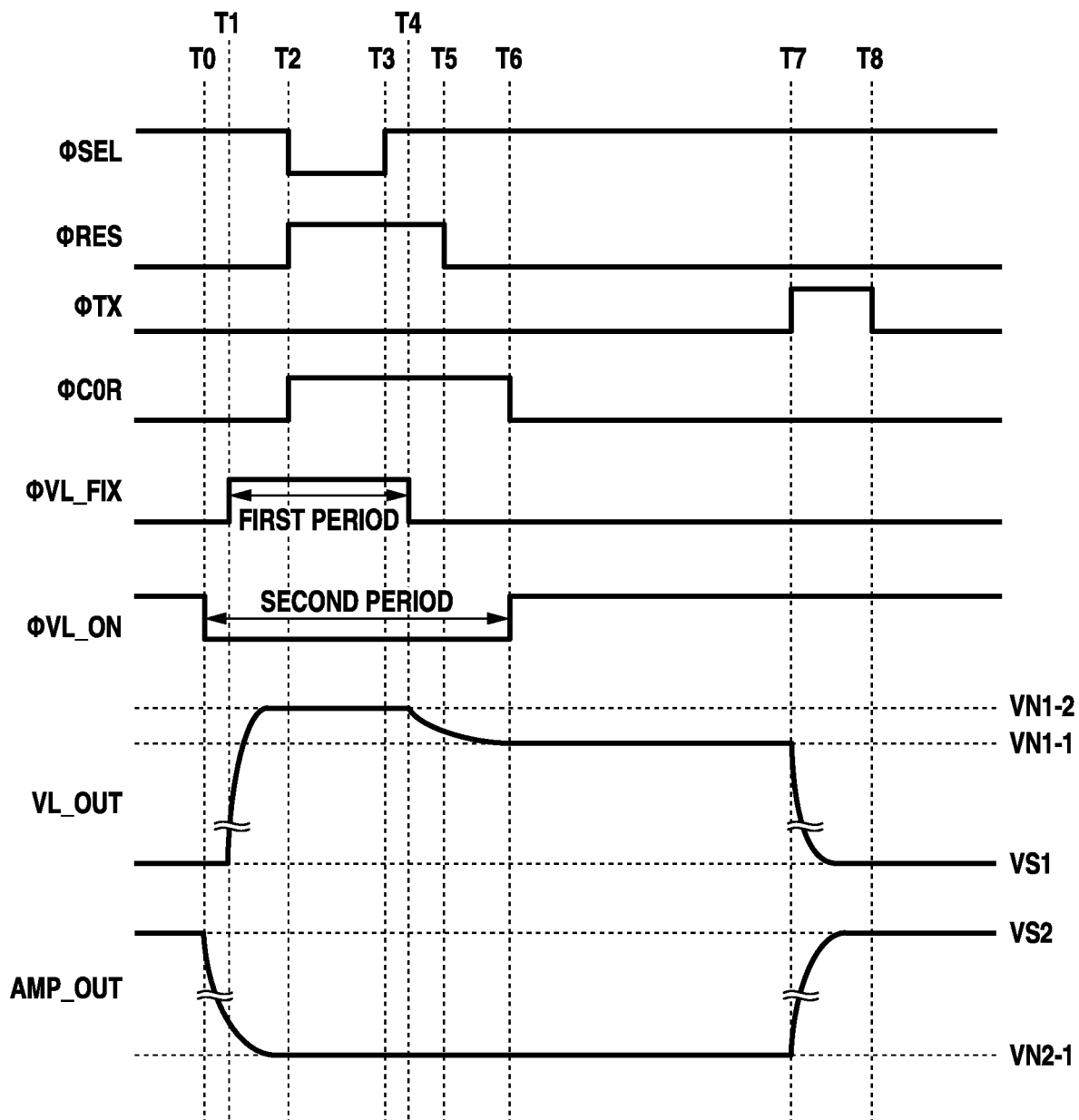
FIG. 9 is a timing chart illustrating an operation of the photoelectric conversion apparatus according to the third exemplary embodiment.

FIG. 9 is a timing chart illustrating an operation of the photoelectric conversion apparatus according to the present exemplary embodiment.

Similarly to the first and second exemplary embodiments, the control signal ΦVL_FIX has the first period. Similarly to the first exemplary embodiment, a period during which the level of the control signal ΦVL_ON is set to LO from the time T0 to T6 will be referred to as a second period.

Similarly to the first exemplary embodiment, the present exemplary embodiment is characterized in that the second period encompasses the first period. In this driving, a reset operation of the vertical output line 103 to a default value is performed using the charge unit 104, during a period during which electric connection between the vertical output line 103 and the amplification unit 105 is shut off. In this case, the amplification unit 105 is not affected by the potential variation even if the potential VL_OUT varies by the reset operation of the vertical output line 103, because connection between the vertical output line 103 and the amplification unit 105 is cut off. As a result, it is possible to realize high-speed driving while preventing image degradation caused by an output variation of an amplification unit.

Figure 10:
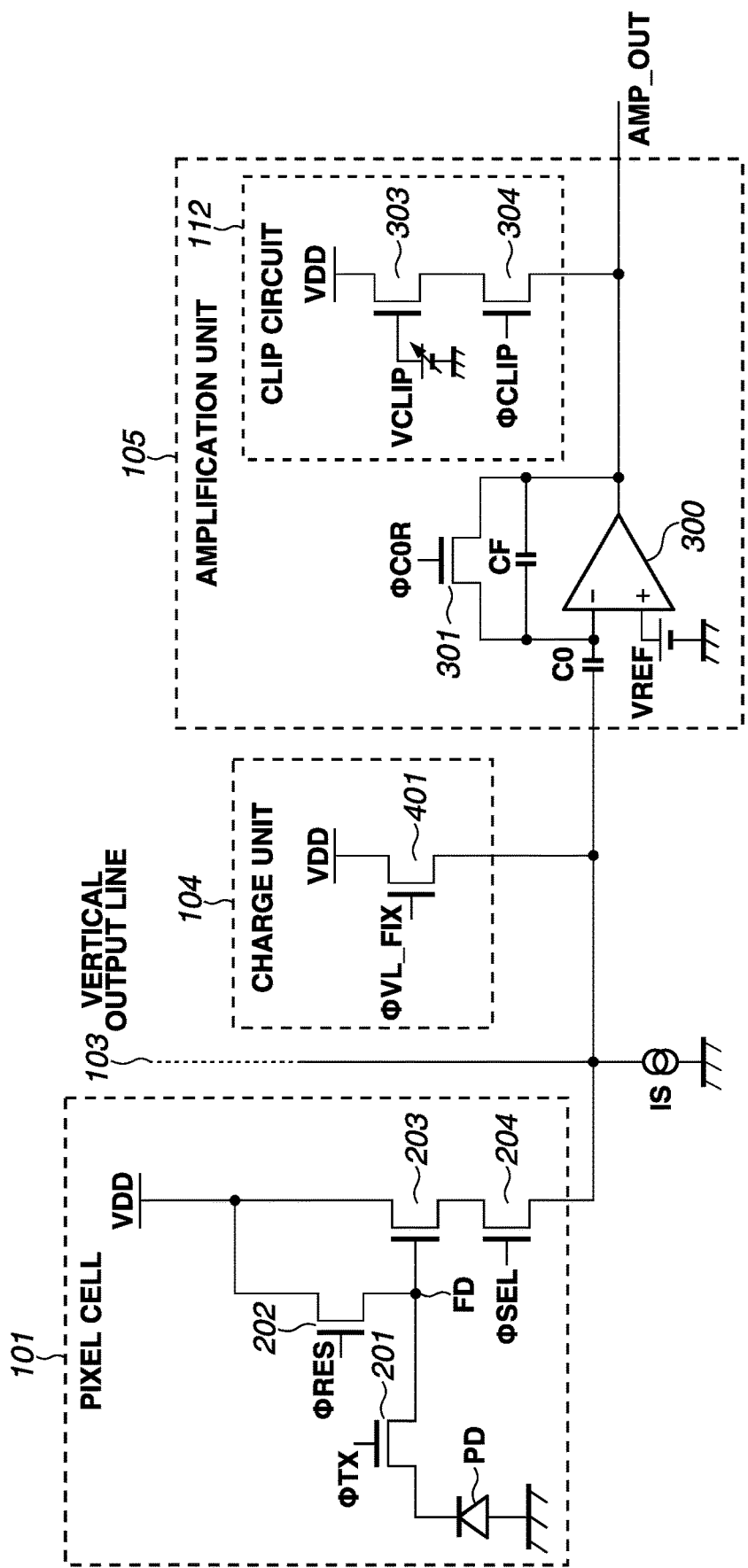
FIG. 10 is a diagram including an equivalent circuit diagram of a pixel of a photoelectric conversion apparatus according to a fourth exemplary embodiment.

A fourth exemplary embodiment will now be described with reference to FIGS. 10 and 11. The components similar to those in the first to third exemplary embodiments are assigned the same reference numerals, and the description thereof will be omitted. The fourth exemplary embodiment is an example of a configuration and an operation of a photoelectric conversion apparatus for realizing the potential relationship described in the second exemplary embodiment.

The photoelectric conversion apparatus according to the fourth exemplary embodiment differs from the photoelectric conversion apparatuses according to the first to third exemplary embodiments in that the amplification unit 105 includes a clip circuit 112. The clip circuit 112 includes a clip element 303 and a switch 304. The clip element 303 is connected to the source voltage VDD at a drain, and connected with the switch 304 at a source.

A variable voltage VCLIP is applied to a gate of the clip element 303. A source of the switch 304 is connected with the amplification unit output AMP_OUT, and controlled in accordance with a control signal ΦCLIP input to a gate. When the level of the control signal ΦCLIP is set to HI, the clip circuit 112 operates, and when the level of the control signal ΦCLIP is set to LO, a clip operation is cancelled. The clip operation is an operation of restricting a changeable range of an output potential of the differential amplifier 300. That is, as compared with a case where the clip operation is not performed, a changeable range of an output potential of the differential amplifier 300 is narrower in a case where the clip operation is performed. Specifically, the clip operation is an operation of restricting an output of the differential amplifier 300 in such a manner as not to exceed a predetermined range, in a case where an output amplitude of the differential amplifier 300 exceeds the predetermined range if the clip operation is not performed. The predetermined range is controlled in accordance with a signal level of the variable voltage VCLIP. By adjusting the signal level of the variable voltage VCLIP, it is possible to fix the output of the differential amplifier 300. That is, the clip circuit 112 has a mode for operating as a circuit that restricts an output range of the differential amplifier 300, and a mode for operating as a circuit that fixes an output of the differential amplifier 300.

If the variable voltage VCLIP becomes larger than the amplification unit output AMP_OUT when the level of the control signal ΦCLIP is set to HI, the clip element 303 enters the on state by a gate-source voltage (VGS) of the clip element 303 opening, and the amplification unit output AMP_OUT is fixed to a predetermined potential.

The clip circuit 112 can also be called a fourth switch provided between an output node of the amplification unit 105 and a second reference potential line.

Figure 11:
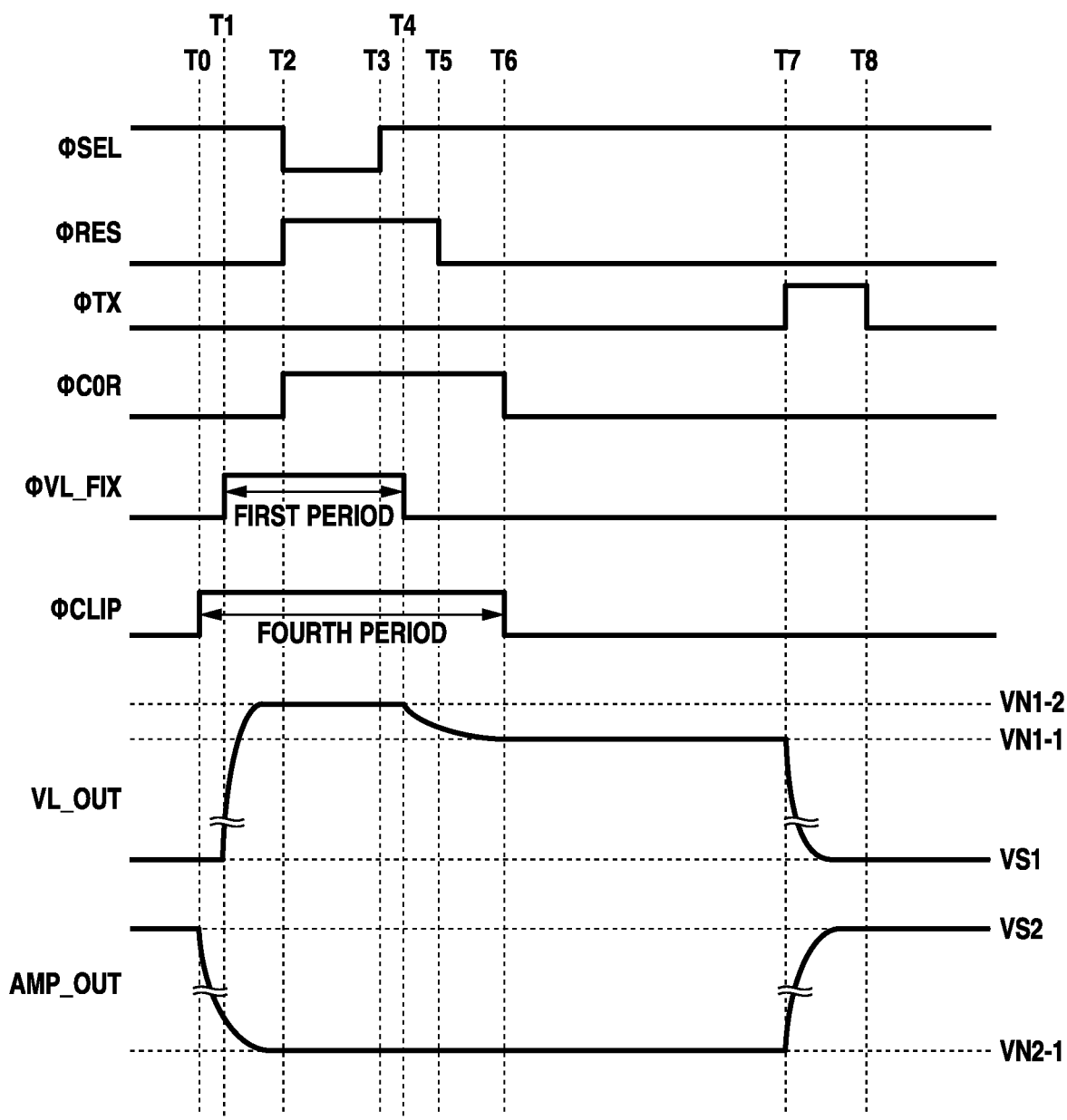
FIG. 11 is a timing chart illustrating an operation of the photoelectric conversion apparatus according to the fourth exemplary embodiment.

FIG. 11 is a timing chart illustrating an operation of the photoelectric conversion apparatus according to the present exemplary embodiment. Similarly to the first exemplary embodiment, the control signal ΦVL_FIX has the first period.

The level of the control signal ΦCLIP is set to HI at a time T0, and set to LO at a time T6. A period during which the level of the control signal ΦCLIP is set to HI in this manner (i.e., a period during which the amplification unit output AMP_OUT of the amplification unit 105 is fixed by the clip circuit 112) will be referred to as a fourth period.

The present exemplary embodiment is characterized in that the fourth period encompasses the first period. In this driving, a reset operation of the vertical output line 103 is performed using the charge unit 104, during a period during which a potential at the output node of the amplification unit 105 is fixed to a predetermined potential by the clip circuit 112.

Since the output node of the amplification unit 105 is fixed, the reset potential of the amplification unit 105 is not affected even if the potential VL_OUT varies by the reset operation of the vertical output line 103.

It is therefore possible to realize high-speed driving while preventing image degradation caused by an output variation of an amplification unit.

Figure 12:
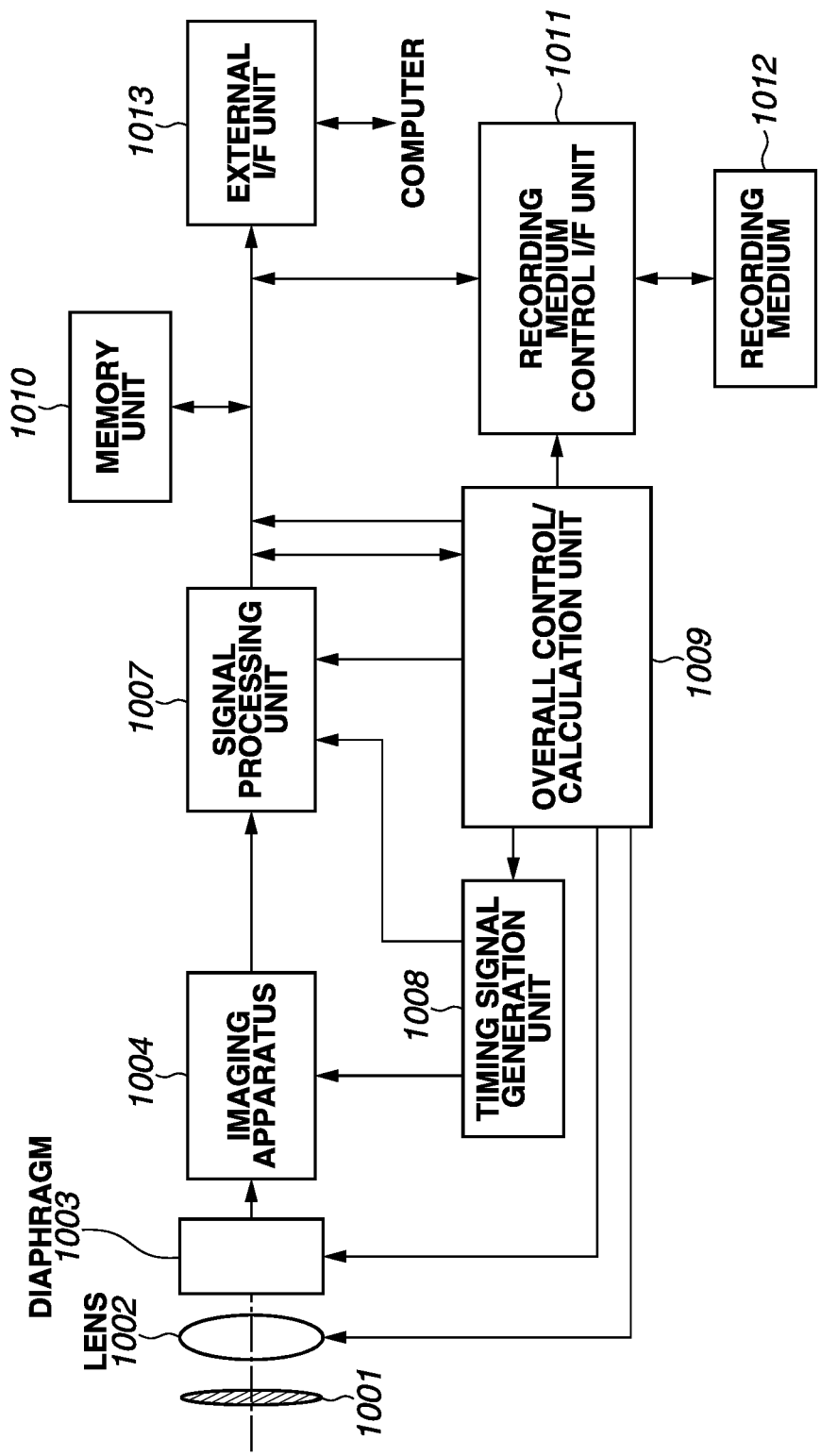
FIG. 12 is a functional block diagram of a photoelectric conversion system according to a fifth exemplary embodiment.

A photoelectric conversion system according to a fifth exemplary embodiment will now be described with reference to FIG. 12. FIG. 12 is a block diagram illustrating a schematic configuration of the photoelectric conversion system according to the present exemplary embodiment.

The photoelectric conversion apparatuses described above in the first to fourth exemplary embodiments can be applied to various photoelectric conversion systems. Examples of photoelectric conversion systems to which the photoelectric conversion apparatus can be applied include a digital still camera, a digital camcorder, a monitoring camera, a copier, a facsimile, a mobile phone, an in-vehicle camera, and an observation satellite. A camera module including an optical system, such as a lens, and an imaging apparatus, is also included in the photoelectric conversion systems. As an example of these photoelectric conversion systems, FIG. 12 exemplarily illustrates a block diagram of a digital still camera.

The photoelectric conversion system exemplified in FIG. 12 includes an imaging apparatus 1004 serving as an example of the photoelectric conversion apparatus, and a lens 1002 that forms an optical image of a subject on the imaging apparatus 1004. The photoelectric conversion system further includes a diaphragm 1003 for varying an amount of light passing through the lens 1002, and a barrier 1001 for protecting the lens 1002. The lens 1002 and the diaphragm 1003 serve as an optical system that focuses light onto the imaging apparatus 1004. The imaging apparatus 1004 is the photoelectric conversion apparatus according to any of the above-described exemplary embodiments. The imaging apparatus 1004 converts an optical image formed by the lens 1002, into an electric signal.

The photoelectric conversion system further includes a signal processing unit 1007 serving as an image generation unit that generates an image by processing an output signal output by the imaging apparatus 1004. The signal processing unit 1007 performs an operation of outputting image data after performing various types of correction and compression as necessary. The signal processing unit 1007 can be formed on a semiconductor substrate on which the imaging apparatus 1004 is provided, or can be formed on a semiconductor substrate different from that of the imaging apparatus 1004.

The photoelectric conversion system further includes a memory unit 1010 for temporarily storing image data, and an external interface unit (external I/F unit) 1013 for communicating with an external computer. The photoelectric conversion system further includes a recording medium 1012, such as a semiconductor memory for recording or reading out captured image data, and a recording medium control interface unit (recording medium control I/F unit) 1011 for performing recording onto or readout from the recording medium 1012. The recording medium 1012 can be built into the photoelectric conversion system, or can be detachably attached to the photoelectric conversion system.

The photoelectric conversion system further includes an overall control/calculation unit 1009 that controls various types of calculation and the entire digital still camera, and a timing signal generation unit 1008 that outputs various timing signals to the imaging apparatus 1004 and the signal processing unit 1007. The timing signals can be input from the outside. In one embodiment, the photoelectric conversion system is only required to include at least the imaging apparatus 1004 and the signal processing unit 1007 that processes an output signal output from the imaging apparatus 1004.

The imaging apparatus 1004 outputs an imaging signal to the signal processing unit 1007. The signal processing unit 1007 performs predetermined signal processing on the imaging signal output from the imaging apparatus 1004 to output image data. The signal processing unit 1007 generates an image using the imaging signal.

According to the present exemplary embodiment, a photoelectric conversion system can be realized to which the photoelectric conversion apparatus (imaging apparatus) according to any of the above-described exemplary embodiments is applied in this manner, a.

Figure 13A:
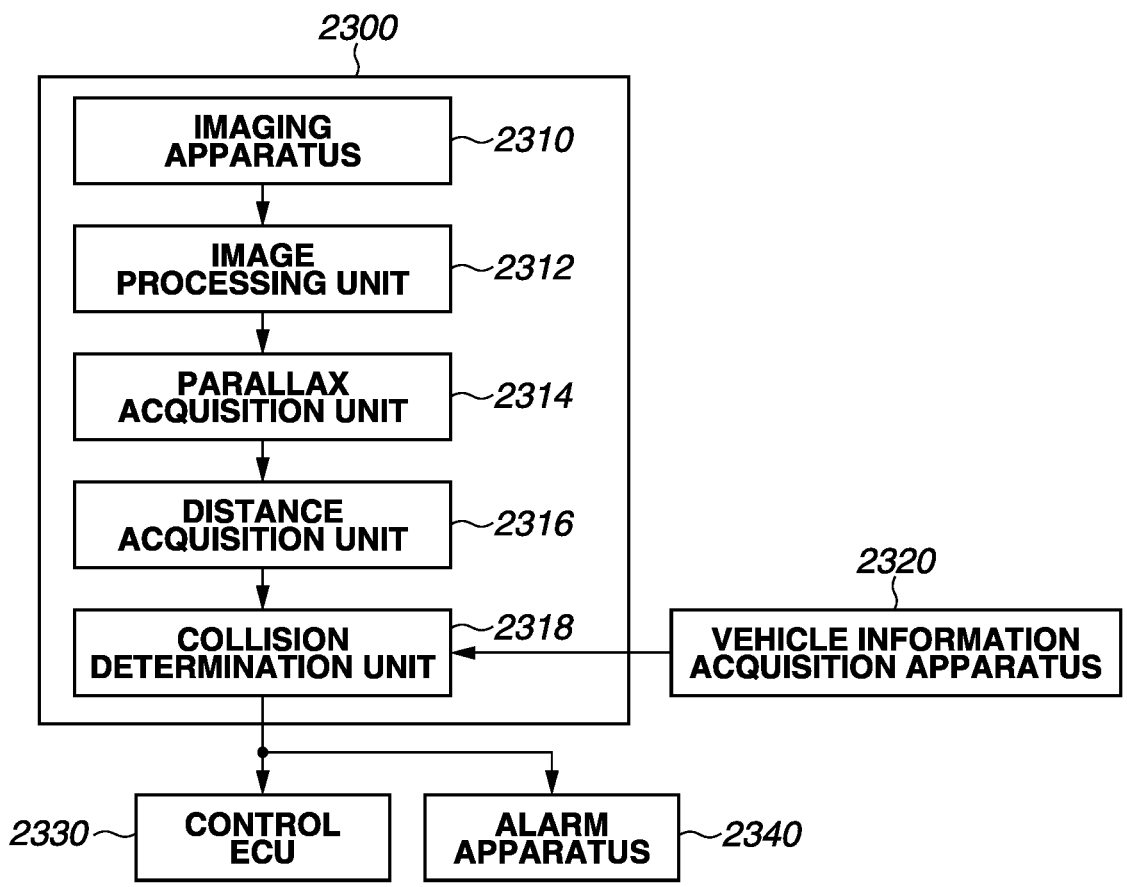
FIG. 13A illustrates an example of a photoelectric conversion system related to an in-vehicle camera.
Figure 13B:
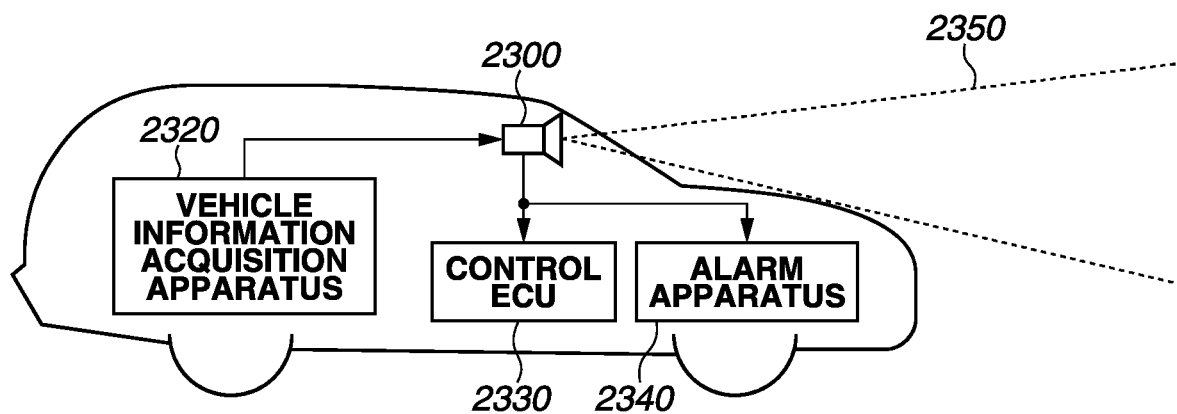
FIG. 13B illustrates the photoelectric conversion system for capturing an image of a vehicle front side.

A photoelectric conversion system and a moving body according to a sixth exemplary embodiment will now be described with reference to FIGS. 13A and 13B. FIGS. 13A and 13B are diagrams illustrating configurations of the photoelectric conversion system and the moving body according to the present exemplary embodiment.

FIG. 13A illustrates an example of a photoelectric conversion system related to an in-vehicle camera. A photoelectric conversion system 2300 includes an imaging apparatus 2310. The imaging apparatus 2310 is the photoelectric conversion apparatus according to any of the above-described exemplary embodiments. The photoelectric conversion system 2300 includes an image processing unit 2312 that performs image processing on a plurality of pieces of image data acquired by the imaging apparatus 2310. The photoelectric conversion system 2300 further includes a parallax acquisition unit 2314 that calculates a parallax (phase difference between parallax images) from the plurality of pieces of image data acquired by the photoelectric conversion system 2300. The photoelectric conversion system 2300 further includes a distance acquisition unit 2316 that calculates a distance to a target object based on the calculated parallax, and a collision determination unit 2318 that determines whether collision is likely to occur based on the calculated distance. In this example, the parallax acquisition unit 2314 and the distance acquisition unit 2316 are examples of a distance information acquisition unit that acquire distance information regarding a distance to a target object. More specifically, the distance information is information regarding a parallax, a defocus amount, and a distance to a target object. The collision determination unit 2318 can determine collision likelihood using any of these pieces of distance information. The distance information acquisition unit can be implemented by dedicatedly-designed hardware, or can be implemented by a software module.

Alternatively, the distance information acquisition unit can be implemented by a field programmable gate array (FPGA) or an application specific integrated circuit (ASIC), or can be implemented by the combination of these.

The photoelectric conversion system 2300 is connected with a vehicle information acquisition apparatus 2320, and can acquire vehicle information, such as a vehicle speed, a yaw rate, or a rudder angle. In addition, a control electronic control unit (ECU) 2330 is connected to the photoelectric conversion system 2300. The ECU 2330 serves as a control unit that outputs a control signal for causing a vehicle to generate braking force, based on a determination result obtained by the collision determination unit 2318. The photoelectric conversion system 2300 is also connected with an alarm apparatus 2340 that raises an alarm to a driver based on a determination result obtained by the collision determination unit 2318. For example, in a case where the determination result obtained by the collision determination unit 2318 indicates high collision likelihood, the control ECU 2330 performs vehicle control for avoiding collision or reducing damages by braking, releasing a gas pedal, or suppressing engine output. The alarm apparatus 2340 issues an alarm to a user by sounding an alarm such as sound, displaying warning information on a screen of a car navigation system, or vibrating a seatbelt or a steering wheel.

In the present exemplary embodiment, the photoelectric conversion system 2300 captures an image of the periphery of the vehicle, such as the front side or the rear side, for example. FIG. 13B illustrates the photoelectric conversion system 2300 for capturing an image of a vehicle front side (imaging range 2350). The vehicle information acquisition apparatus 2320 issues an instruction to the photoelectric conversion system 2300 or the imaging apparatus 2310. With such a configuration, the accuracy of distance measurement can be further enhanced.

The above description has been given of an example in which control is performed in such a manner as not to collide with another vehicle. The photoelectric conversion system can also be applied to the control for performing automatic operation by following another vehicle, or the control for performing automatic operation in such a manner as not to deviate from a lane. Furthermore, the photoelectric conversion system can be applied to a moving body (moving apparatus), such as a vessel, an aircraft, or an industrial robot, aside from a vehicle such as an automobile. Moreover, the photoelectric conversion system can be applied to a device that extensively uses object recognition, such as an intelligent transport system (ITS), in addition to a moving body.

Figure 14:
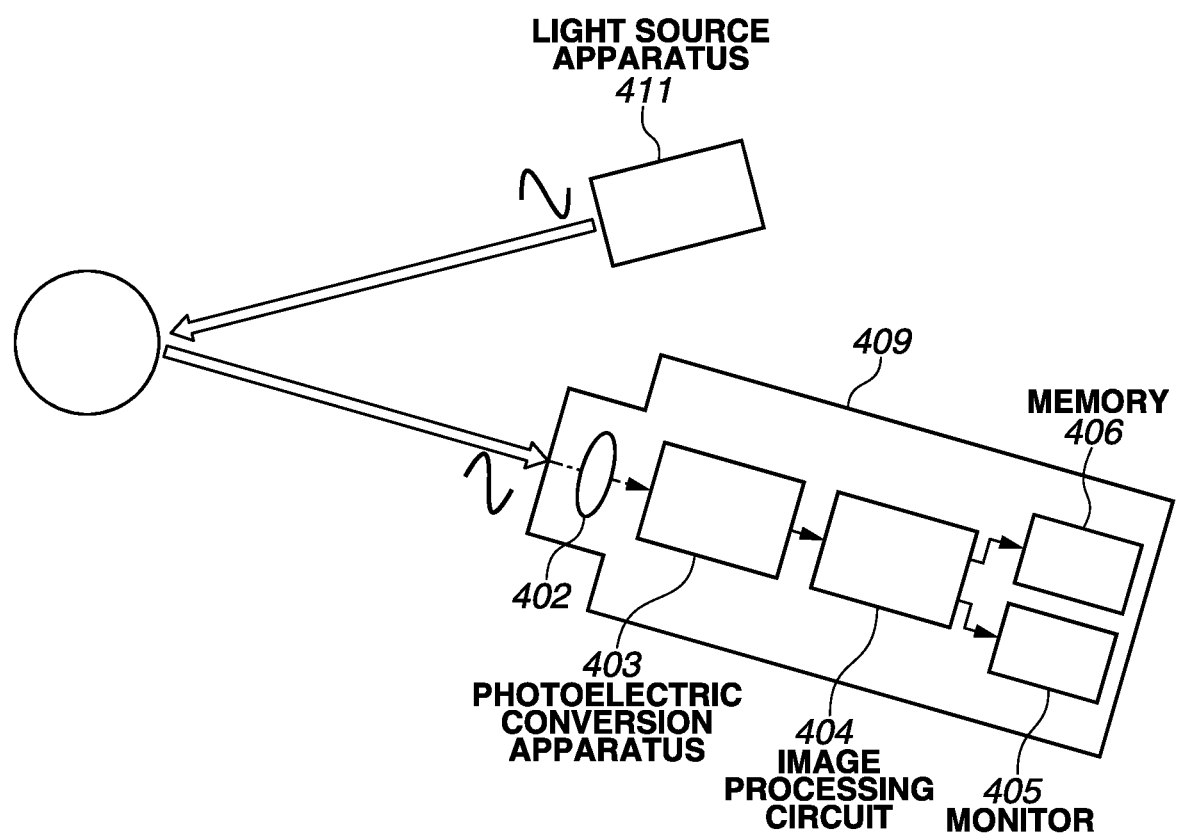
FIG. 14 is a functional block diagram of a photoelectric conversion system according to a seventh exemplary embodiment.

A photoelectric conversion system according to a seventh exemplary embodiment will now be described with reference to FIG. 14. FIG. 14 is a block diagram illustrating a configuration example of a distance image sensor serving as the photoelectric conversion system according to the present exemplary embodiment.

As illustrated in FIG. 14, a distance image sensor 409 includes an optical system 402, a photoelectric conversion apparatus 403, an image processing circuit 404, a monitor 405, and a memory 406. The distance image sensor 409 receives light (modulated light or pulse light) that has been projected from a light source apparatus 411 toward the subject and reflected on the front surface of the subject, and thereby acquires a distance image corresponding to a distance to a subject.

The optical system 402 includes one or more lenses, guides image light (incident light) from the subject to the photoelectric conversion apparatus 403, and forms an image on a light receiving surface (sensor portion) of the photoelectric conversion apparatus 403.

The photoelectric conversion apparatus according to any of the above exemplary embodiments is applied as the photoelectric conversion apparatus 403, and a distance signal indicating a distance obtained from a light receiving signal output from the photoelectric conversion apparatus 403 is supplied to the image processing circuit 404.

The image processing circuit 404 performs image processing of constructing a distance image, based on the distance signal supplied from the photoelectric conversion apparatus 403. A distance image (image data) obtained by the image processing is supplied to the monitor 405 and displayed thereon, or supplied to the memory 406 and stored (recorded) therein.

By applying the above-described photoelectric conversion apparatus, the distance image sensor 409 having the above-described configuration can acquire an accurate distance image, for example, in accordance with characteristic enhancement of a pixel.

A photoelectric conversion system according to an eighth exemplary embodiment will now be described with reference to FIG. 15. FIG. 15 is a diagram illustrating an example of a schematic configuration of an endoscopic operation system serving as a photoelectric conversion system of the present exemplary embodiment.

FIG. 15 illustrates a state in which an operator (doctor) 1131 is performing an operation on a patient 1132 lying on a patient bed 1133, using an endoscopic operation system 1150. As illustrated in FIG. 15, the endoscopic operation system 1150 includes an endoscope 1100, a surgical tool 1110, and a cart 1134 equipped with various apparatuses for an endoscopic operation.

The endoscope 1100 includes a lens barrel 1101 having a region to be inserted into a body cavity of the patient 1132 by a predetermined length from a distal end, and a camera head 1102 connected to a proximal end of the lens barrel 1101. In the example illustrated in FIG. 15, the endoscope 1100 formed as a so-called rigid scope including the rigid lens barrel 1101 is illustrated, but the endoscope 1100 may be formed as a so-called flexible scope including a flexible lens barrel.

An opening portion into which an objective lens is fitted is provided at the distal end of the lens barrel 1101. A light source apparatus 1203 is connected to the endoscope 1100, and light generated by the light source apparatus 1203 is guided to the distal end of the lens barrel 1101 by a light guide extended inside the lens barrel 1101, and the light is emitted onto an observation target in the body cavity of the patient 1132 via the objective lens. The endoscope 1100 can be a direct view endoscope, or can be an oblique view endoscope or a lateral view endoscope.

Inside the camera head 1102, an optical system and a photoelectric conversion apparatus are provided. Reflected light (observation light) from an observation target is focused by the optical system to the photoelectric conversion apparatus. The observation light is photoelectrically-converted by the photoelectric conversion apparatus, and an electric signal corresponding to the observation light (i.e., image signal corresponding to an observed image) is generated. For this photoelectric conversion apparatus, the photoelectric conversion apparatus according to any of the above exemplary embodiments can be used. The image signal is transmitted to a camera control unit (CCU) 1135 as RAW data.

The CCU 1135 includes a central processing unit (CPU) or a graphics processing unit (GPU), and comprehensively controls operations of the endoscope 1100 and a display device 1136. Furthermore, the CCU 1135 receives an image signal from the camera head 1102, and performs various types of image processing for displaying an image that is based on the image signal, such as development processing (demosaic processing), on the image signal.

Based on the control from the CCU 1135, the display device 1136 displays an image that is based on an image signal on which image processing has been performed by the CCU 1135.

The light source apparatus 1203 includes a light source, such as a light emitting diode (LED), and supplies irradiating light for capturing an image of an operative site, to the endoscope 1100.

An input apparatus 1137 is an input interface for the endoscopic operation system 1150. A user can input various types of information and instructions to the endoscopic operation system 1150 via the input apparatus 1137.

A processing tool control apparatus 1138 controls the driving of an energy processing tool 1112 for cauterizing or cutting a tissue, or sealing a blood vessel.

The light source apparatus 1203 that supplies irradiating light for capturing an image of an operative site, to the endoscope 1100 can include, for example, an LED, a laser light source, or a white light source including a combination of these. In a case where a white light source includes a combination of RGB laser light sources, white balance of a captured image can be adjusted in the light source apparatus 1203 because output intensity and an output timing of each color (each wavelength) can be controlled highly accurately.

In this case, an image corresponding to each of RGB can be captured in a time division manner by emitting laser light from each RGB laser light source onto an observation target in a time division manner and controlling the driving of an image sensor of the camera head 1102 in synchronization with the emission timing. According to the method, a color image can be obtained without providing a color filter onto the image sensor.

The driving of the light source apparatus 1203 can be controlled in such a manner as to change the intensity of light to be output, every predetermined time. By acquiring images in a time division manner by controlling the driving of the image sensor of the camera head 1102 in synchronization with the change timing of the light intensity and combining the images, it is possible to generate a high dynamic range image without so-called blocked up shadows and clipped whites.

The light source apparatus 1203 can be configured to supply light in a predetermined wavelength band adapted to special light observation. In the special light observation, wavelength dependency of light absorption in body tissues is utilized, for example. Specifically, an image of a predetermined tissue, such as a blood vessel in a superficial portion of a mucous membrane, is captured with high contrast by emitting light in a narrower band as compared with irradiating light (i.e., white light) in normal observation.

Alternatively, in special light observation, fluorescent observation of obtaining an image by fluorescence generated by emitting excitation light can be performed. In the fluorescent observation, fluorescence from a body tissue can be observed by emitting excitation light onto the body tissue, or a fluorescent image can be obtained by locally injecting reagent, such as indocyanine green (ICG), into a body tissue and emitting excitation light suitable for a fluorescence wavelength of the reagent, onto the body tissue. The light source apparatus 1203 can be configured to supply narrow-band light and/or excitation light adapted to such special light observation.

Figure 16A:
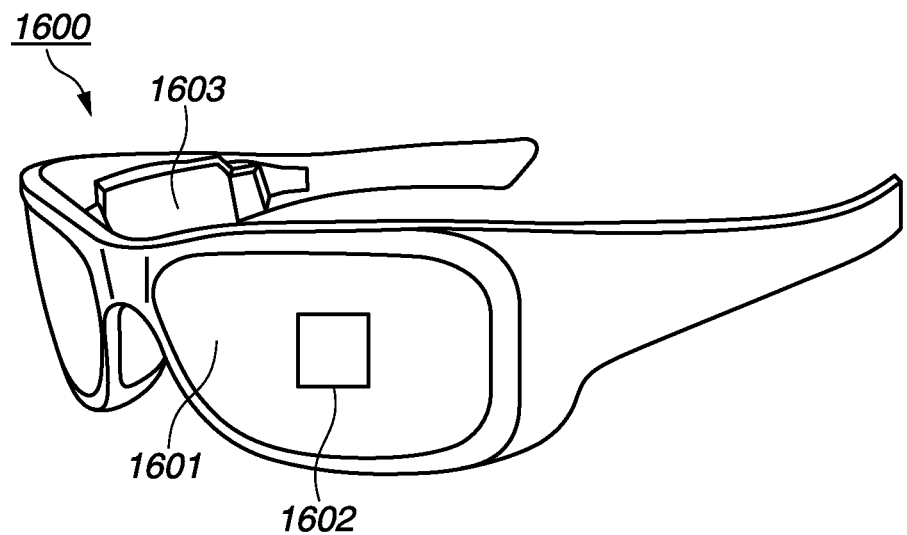
FIG. 16A illustrates eyeglasses serving as a photoelectric conversion system.

A photoelectric conversion system according to a ninth exemplary embodiment will now be described with reference to FIGS. 16A and 16B. FIG. 16A illustrates eyeglasses 1600 (smart glasses) serving as a photoelectric conversion system according to the present exemplary embodiment. The eyeglasses 1600 include a photoelectric conversion apparatus 1602. The photoelectric conversion apparatus 1602 is the photoelectric conversion apparatus described in any of the above-described exemplary embodiments. A display device including a light emission device, such as an organic light emitting diode (OLED) or an LED, can be provided on the back surface side of a lens 1601. The number of photoelectric conversion apparatuses 1602 can be one or plural. A plurality of types of photoelectric conversion apparatuses can be used in combination. An arrangement position of the photoelectric conversion apparatus 1602 is not limited to the position illustrated in FIG. 16A.

The eyeglasses 1600 further include a control apparatus 1603. The control apparatus 1603 functions as a power source that supplies power to the photoelectric conversion apparatus 1602 and the above-described display device. The control apparatus 1603 also controls operations of the photoelectric conversion apparatus 1602 and the display device. In the lens 1601, an optical system is formed for focusing light to the photoelectric conversion apparatus 1602.

Figure 16B:
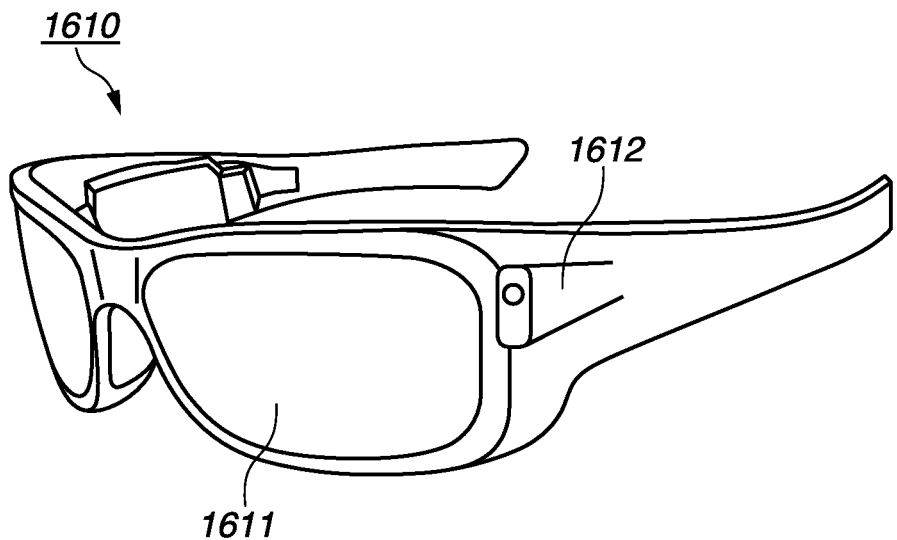
FIG. 16B illustrates eyeglasses according to one application example.

FIG. 16B illustrates eyeglasses 1610 (smart glasses) according to one application example. The eyeglasses 1610 include a control apparatus 1612. The control apparatus 1612 is equipped with a photoelectric conversion apparatus equivalent to the photoelectric conversion apparatus 1602, and a display device. In a lens 1611, the photoelectric conversion apparatus in the control apparatus 1612 and an optical system for projecting light emitted from the display device are formed, and an image is projected onto the lens 1611. The control apparatus 1612 functions as a power source that supplies power to the photoelectric conversion apparatus and the display device, and controls operations of the photoelectric conversion apparatus and the display device. The control apparatus 1612 can include a visual line detection unit that detects a visual line of a wearer. Infrared light can be used for detecting a visual line. An infrared light emission unit emits infrared light onto an eyeball of a user looking at a displayed image. An imaging unit including a light receiving element detects reflected light of the emitted infrared light that has been reflected from the eyeball. A captured image of the eyeball is thereby obtained. By including a reduction unit for reducing light from the infrared light emission unit to a display unit in a planar view, a decline in image quality is suppressed.

From a captured image of an eyeball obtained by the image capturing using infrared light, a visual line of a user with respect to a displayed image is detected. An arbitrary known method can be applied to visual line detection that uses a captured image of an eyeball. As an example, a visual line detection method that is based on a Purkinje image obtained by reflection of irradiating light on a cornea can be used.

More specifically, visual line detection processing that is based on the pupil center corneal reflection is performed. An eye vector representing the direction (rotational angle) of an eyeball is calculated based on an image of a pupil included in a captured image of the eyeball and a Purkinje image using the pupil center corneal reflection, and thereby a visual line of a user is detected.

The display device according to the present exemplary embodiment can include the photoelectric conversion apparatus including a light receiving element, and control a displayed image on the display device based on visual line information of the user from the photoelectric conversion apparatus.

Specifically, in the display device, a first eyeshot region viewed by the user and a second eyeshot region other than the first eyeshot region are determined based on the visual line information. A control apparatus of the display device can determine the first eyeshot region and the second eyeshot region, or receive the first eyeshot region and the second eyeshot region determined by an external control apparatus. In a display region of the display device, a display resolution of the first eyeshot region can be controlled to be higher than a display resolution of the second eyeshot region. In other word, a resolution of the second eyeshot region can be made lower than a resolution of the first eyeshot region.

The display region includes a first display region and a second display region different from the first display region. Based on the visual line information, a region with high priority can be determined from the first display region and the second display region. The first display region and the second display region can be determined by a control apparatus of the display device, or a first display region and a second display region determined by an external control apparatus can be received. A resolution of a region with high priority can be controlled to be higher than a resolution of a region other than the region with high priority. In other words, a resolution of a region with relatively-low priority can be set to a low resolution.

To determine the first eyeshot region and the region with high priority, artificial intelligence (AI) can be used. The AI can be a model configured to estimate an angle of a visual line and a distance to a target object existing at the end of the visual line, from an image of an eyeball by using teaching data including an image of the eyeball, and a direction in which the eyeball of the image actually gives a gaze. An AI program can be included in the display device, the photoelectric conversion apparatus, or an external apparatus. In a case where an external apparatus includes the AI program, the AI program is transmitted to the display device through communication.

In a case where display control is performed based on visual detection, the aspect of the embodiments can be applied to smart glasses further including a photoelectric conversion apparatus that captures an image of the outside. The smart glasses can display external information obtained by image capturing in real time.

The disclosure is not limited to the above-described exemplary embodiments, and various modifications can be made. For example, an example in which a partial configuration of a certain exemplary embodiment is added to another exemplary embodiment, and an example in which a partial configuration of a certain exemplary embodiment is replaced with a partial configuration of another exemplary embodiment are also included in the exemplary embodiments of the disclosure.

The photoelectric conversion systems described in the above-described fifth and sixth exemplary embodiments indicate examples of photoelectric conversion systems to which a photoelectric conversion apparatus can be applied, and a photoelectric conversion system to which a photoelectric conversion apparatus according to an exemplary embodiment of the disclosure can be applied is not limited to the configurations illustrated in FIGS. 12 to 13B. The same applies to the TOF system described in the seventh exemplary embodiment, the endoscope described in the eighth exemplary embodiment, and the smart glasses described in the ninth exemplary embodiment.

Each of the above-described exemplary embodiments merely indicates a specific example in carrying out the disclosure, and the technical scope of the disclosure is not to be construed in a limiting manner based on these. In other words, the disclosure can be implemented in various forms without departing from the technical idea or major features thereof.

According to the disclosure, it is possible to further speed up a signal readout speed of a photoelectric conversion apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-088835, filed May 31, 2022, which is hereby incorporated by reference herein in its entirety.

What is claimed is:

1. An apparatus including a readout line, and a plurality of pixel cells each including a conversion unit, floating diffusion configured to output a signal corresponding to a charge generated by the conversion unit, and a selection switch provided on a pathway between the floating diffusion and the readout line, the apparatus comprising:
   a circuit configured to connect to the plurality of pixel cells via the readout line;
   a first switch provided on a pathway between the readout line and a first reference potential line;
   a second switch provided on a pathway between the readout line and the circuit; and
   a control unit configured to bring the second switch into an off state during a first period during which the first switch is in an on state,
   wherein a second period during which the second switch is in an off state encompasses a period during which a potential of the floating diffusion is reset,
   wherein the plurality of pixel cells includes a first pixel cell arranged in a first pixel row and a second pixel cell arranged in a second pixel row, and
   wherein, during the second period, the readout line and the second pixel cell become connected to each other after a connection between the readout line and the first pixel cell is cut off.

2. The apparatus according to claim 1, wherein the circuit includes to an amplification circuit configured to amplify a signal output from the plurality of pixel cells.

3. The apparatus according to claim 2,
   wherein the amplification circuit includes an input node, an output node, and a third switch connected to the input node and the output node, and
   wherein the control unit brings the first switch into an on state during a period during which the third switch is in an on state.

4. The apparatus according to claim 1, wherein the second period encompasses the first period.

5. An apparatus including a plurality of pixel cells each including a conversion unit, and a floating diffusion configured to output a signal corresponding to a charge generated by the conversion unit, the apparatus comprising:
   a readout line configured to connect to the plurality of pixel cells;
   a first switch provided between the readout line and a first potential line;
   an amplification circuit configured to amplify a signal output from the plurality of pixel cells; and
   a control unit configured to control the first switch,
   wherein the amplification circuit includes an input node, an output node, a third switch connected to the input node and the output node,
   wherein the control unit is configured to bring the first switch into an on state during a third period during which the third switch is in an on state, and
   wherein the third period encompasses a period during which a potential of the floating diffusion is reset.

6. The apparatus according to claim 5, wherein the third period encompasses a first period during which the first switch is in an on state.

7. An apparatus including a plurality of pixel cells each including a conversion unit, and a floating diffusion configured to output a signal corresponding to a charge generated by the conversion unit, the apparatus comprising:
   a readout line configured to connect to the plurality of pixel cells;
   a first switch provided between the readout line and a first potential line;
   an amplification circuit configured to amplify a signal output from the plurality of pixel cells; and
   a control unit configured to control the first switch,
   wherein the amplification circuit includes an output node, a fourth switch provided between the output node and a second potential line, wherein the control unit is configured to bring the first switch into an on state during a fourth period during which the fourth switch is in an on state, and wherein the fourth period encompasses a period during which a potential of the floating diffusion is reset.

8. The apparatus according to claim 7, wherein the fourth period encompasses a first period during which the first switch is in an on state.

9. A system comprising:
the apparatus according to claim 1; and
a processing unit configured to generate an image using a signal output by the apparatus.

10. The system according to claim 9, wherein in the apparatus, the circuit includes an amplification circuit configured to amplify a signal output from the plurality of pixel cells.

11. The system according to claim 10, wherein in the apparatus,
the amplification circuit includes an input node, an output node, and a third switch connected to the input node and the output node, and
the control unit brings the first switch into an on state during a period during which the third switch is in an on state.

12. The system according to claim 9, wherein in the apparatus, the second period encompasses the first period.

13. A moving body including the apparatus according to claim 1, wherein the moving body includes a control unit configured to control a movement of the moving body using a signal output by the apparatus.

14. The moving body according to claim 13, wherein in the apparatus, the circuit includes an amplification circuit configured to amplify a signal output from the plurality of pixel cells.

15. The moving body according to claim 14, wherein in the apparatus,
the amplification circuit includes an input node, an output node, and a third switch connected to the input node and the output node, and
the control unit brings the first switch into an on state during a period during which the third switch is in an on state.

16. The apparatus according to claim 1, wherein, during the first period, the readout line and the second pixel cell become connected to each other after the connection between the readout line and the first pixel cell is cut off.

17. The apparatus according to claim 5,
wherein the plurality of pixel cells includes a first pixel cell arranged in a first pixel row and a second pixel cell arranged in a second pixel row, and
wherein, during the third period, the readout line and the second pixel cell become connected to each other after a connection between the readout line and the first pixel cell is cut off.

18. The apparatus according to claim 17, wherein, during a first period during which the first switch is in an on state, the readout line and the second pixel cell become connected to each other after the connection between the readout line and the first pixel cell is cut off.

19. The apparatus according to claim 7,
wherein the plurality of pixel cells includes a first pixel cell arranged in a first pixel row and a second pixel cell arranged in a second pixel row, and
wherein, during the fourth period, the readout line and the second pixel cell become connected to each other after a connection between the readout line and the first pixel cell is cut off.

20. The apparatus according to claim 19, wherein, during a first period during which the first switch is in an on state, the readout line and the second pixel cell become connected to each other after the connection between the readout line and the first pixel cell is cut off.

* * * * *